(12) United States Patent
Huang et al.

(10) Patent No.: US 10,172,180 B1
(45) Date of Patent: Jan. 1, 2019

(54) CONFIGURING NETWORK CONNECTIONS

(71) Applicant: Marvell International Ltd., Hamilton (BM)

(72) Inventors: Frank Huang, Dublin, CA (US); Hao Li, Suzhou (CN); Tao Song, Shanghai (CN); Qun Zhang, Shanghai (CN); Nishant Sarmukadam, Pune (IN); Timothy J. Donovan, Livermmore, CA (US)

(73) Assignee: Marvell International Ltd., Hamilton (BM)

( * ) Notice: Subject to any disclaimer, the term of this patent is extended or adjusted under 35 U.S.C. 154(b) by 168 days.

(21) Appl. No.: 15/245,654

(22) Filed: Aug. 24, 2016

Related U.S. Application Data

(60) Provisional application No. 62/260,975, filed on Nov. 30, 2015, provisional application No. 62/209,692, filed on Aug. 25, 2015.

(51) Int. Cl.
| | | |
|---|---|---|
| *H04W 76/25* | (2018.01) | |
| *H04W 40/24* | (2009.01) | |
| *H04B 17/318* | (2015.01) | |
| *H04L 12/26* | (2006.01) | |
| *H04W 56/00* | (2009.01) | |
| *H04L 12/801* | (2013.01) | |
| *H04L 29/06* | (2006.01) | |

(52) U.S. Cl.
CPC .......... *H04W 76/25* (2018.02); *H04B 17/318* (2015.01); *H04L 43/12* (2013.01); *H04L 43/16* (2013.01); *H04L 47/17* (2013.01); *H04L 69/28* (2013.01); *H04W 40/244* (2013.01); *H04W 56/0015* (2013.01)

(58) Field of Classification Search
CPC .............. H04W 76/25; H04W 40/244; H04W 56/0015; H04L 43/12; H04L 43/16
See application file for complete search history.

(56) References Cited

U.S. PATENT DOCUMENTS

| | | | |
|---|---|---|---|
| 6,580,700 B1 * | 6/2003 | Pinard ............... | G06K 17/0022 370/332 |
| 9,571,199 B1 | 2/2017 | Bannon et al. | |
| 9,681,374 B2 | 6/2017 | Cui et al. | |
| 9,756,682 B2 | 9/2017 | Iyer et al. | |

(Continued)

OTHER PUBLICATIONS

U.S. Appl. No. 15/166,188, Office Action dated Dec. 6, 2017, 12 pages.

*Primary Examiner* — Wei Zhao

(57) ABSTRACT

A first network interface and a second network interface of a wireless network device are respectively controlled to operate as a station in a first wireless network and as an access point in a second wireless network. A beacon message, which includes a first signal strength of a first bridge node that is an access point in the first wireless network, is transmitted through the second network interface. A probe response message, which includes a second signal strength of a second bridge node that is an access point in a third wireless network, is received at the second network interface. Conditioned on determining that the second signal strength is greater than the first signal strength, the first network interface is disconnected from the first bridge node and is connected to the second bridge node to operate as a station in the third wireless network.

22 Claims, 8 Drawing Sheets

(56) References Cited

U.S. PATENT DOCUMENTS

| | | | |
|---|---|---|---|
| 9,819,901 B1* | 11/2017 | Zhu | H04N 7/102 |
| 2011/0292922 A1 | 12/2011 | Yang | |
| 2012/0314621 A1 | 12/2012 | Finn et al. | |
| 2013/0170435 A1* | 7/2013 | Dinan | H04L 45/50 370/328 |
| 2014/0269476 A1 | 9/2014 | Weston et al. | |
| 2015/0195198 A1 | 7/2015 | Shin et al. | |
| 2016/0112947 A1 | 4/2016 | Sahoo et al. | |
| 2017/0171111 A1 | 6/2017 | Khare et al. | |

* cited by examiner

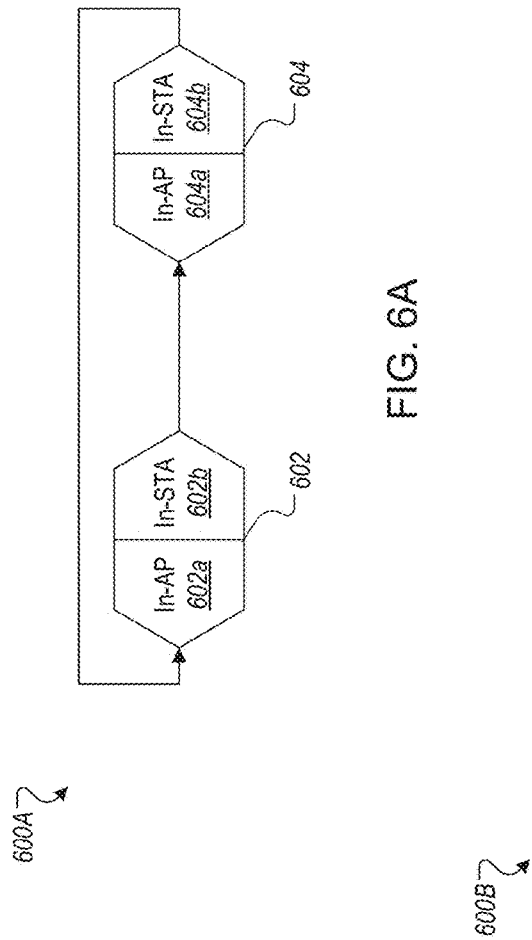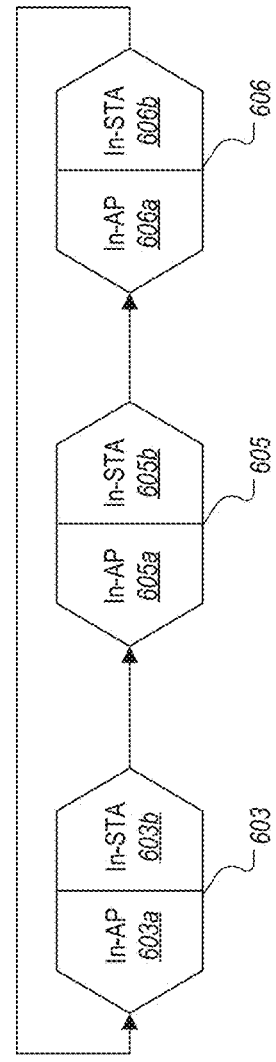
FIG. 6A
FIG. 6B

CONFIGURING NETWORK CONNECTIONS

CROSS REFERENCE TO RELATED APPLICATIONS

This application claims the benefit of priority under 35 U.S.C. § 119(e) of U.S. Provisional Application No. 62/209,692, filed on Aug. 25, 2015, and entitled "Automatic Configuration in Internet of Things Bridge Network," and U.S. Provisional Application No. 62/260,975, filed on Nov. 30, 2015, and entitled "Automatic Configuration in Internet of Things Bridge Network," each of which is incorporated herein by reference in its entirety.

BACKGROUND

The following disclosure relates generally to systems and techniques for configuring network connections.

Network devices can communicate with one another using wireless communication, e.g., in a wireless network based on Institute of Electrical and Electronics Engineers (IEEE) 802.11 family of protocols. Some network devices may be connected to an access point (AP) in a wireless network directly. Some devices may not receive strong signals from the AP, and a network bridge device can be used to connect such devices to the wireless network.

SUMMARY

The present disclosure describes devices, systems and techniques for a wireless network bridge to find the best link to connect network devices to a wireless network. The wireless network bridge, which is also referred to as a bridge or bridge device, is used to connect, to a primary access point (AP) in the wireless network, one or more Internet of Things (IoT) network devices that are outside the range of direct connections to the central AP, which is also referred to as the external AP.

The bridge includes multiple network interfaces. The bridge uses a first network interface to connect to the central AP in the wireless network, and operates as a client network device in the wireless network. The bridge includes one or more additional network interfaces at which the bridge creates one or more internal wireless networks. In each of these internal wireless networks, the bridge acts as a secondary access point using the respective network interface. For distinction, the larger wireless network is referred to as the external wireless network to differentiate from the internal wireless networks created by the bridge. The primary AP in the larger wireless network is referred to as an external AP, while a secondary access point created by the bridge for an internal wireless network is referred to as an internal AP. The bridge can derive service set identifiers (SSIDs) and passwords for the internal wireless networks based on the SSID and password of the external AP. Network devices, including IoT network devices, connect as stations to the internal wireless networks.

In some implementations, there are multiple bridge devices in the wireless network. In some implementations, a first bridge reaches the external AP by connecting a first network interface of the first bridge to another bridge device. In this context, a second bridge that acts as an intermediate node in a network path and connects the first bridge to the external AP is referred to as an upstream bridge or upstream node of the first bridge, and the connection from the first bridge to the second bridge is referred to as an upstream connection or upstream link of the first bridge. In this context, "upstream" means in the direction of the external AP, and "downstream" means in the direction of the end stations. When connected to an upstream bridge, the first bridge checks whether a better upstream connection to the external AP through another bridge device is available. The first bridge performs this check by transmitting a probe message that includes the signal strength for the presently connected upstream bridge. The probe message is transmitted. e.g., broadcast, either as a periodic scan, or upon detecting that the link quality to the presently connected upstream bridge is poor (e.g., signal level or data rate below certain threshold values). In some implementations, the transmitted message also includes other parameters for the upstream connection, e.g., a hop count to reach the external AP through the presently connected upstream bridge.

In some implementations, the first bridge receives a wireless response message from a different bridge device in the network to which the first bridge is not connected, the response message including one or more different parameters for the sender, such as the signal strength for the new bridge device, a hop count to reach the external AP through the new bridge device, or other suitable parameters. In some implementations, the various parameters, such as the signal strength and the hop count, in a wireless beacon or response message are fields of an information element (IE) included in the respective message.

In some implementations, the first bridge compares the signal strength in the received response message to the signal strength for the presently connected upstream bridge. If the signal strength in the response message is greater, then the first bridge disconnects the first network interface of the first bridge from the presently connected upstream bridge, and connects the first network interface to the new bridge device, thereby operating as a station in the internal wireless network of the new bridge device.

In some implementations, if the signal strengths are the same, the first bridge compares the hop count in the response message to the hop count through the presently connected upstream bridge. If the hop count in the response message is less, then the first bridge disconnects its first network interface from the presently connected upstream bridge, and connects the first network interface to the new bridge device. In this manner, the first bridge finds a new path to the external AP through the new bridge device.

In some implementations, the first bridge checks whether a dead loop exists in the present upstream connection of the first bridge (e.g., the connection loops back to the first bridge without reaching the external AP), or in a prospective new connection. The first bridge performs this check by comparing additional fields in the wireless beacon and response messages, e.g., the association identifier (AID) of a head bridge node in each connection that is directly connected to the external AP. When a wireless beacon or response message includes an AID to the external AP that is same as the AID to the external AP for the present network path for the first bridge, but the hop count to the external AP indicated in the received message is greater than hop count for the present network path of the first bridge, this indicates a dead loop through the neighboring bridge device that sent the beacon or probe response message. If the neighboring bridge is a prospective upstream node, the first bridge does not connect to the prospective bridge upon determination of a dead loop. If the first bridge detects a dead loop for its present connection based on the hop count comparison described above, the first bridge disconnects from the presently connected upstream bridge node and selects a new bridge node for the upstream connection (unless the first bridge can connect directly to the external AP). In some implementations, the AID in a wireless beacon or response message is a field of an information element (IE) included in the respective message.

In a general aspect, a first network interface of a wireless network device is controlled to operate as a station in a first wireless network. A second network interface of the wireless network device is controlled to operate as an access point in a second wireless network. A beacon message, which includes a first signal strength of a first bridge node operating as an access point in the first wireless network, is transmitted through the second network interface. A probe response message is received at the second network interface from a second bridge node that operates as an access point in a third wireless network. The probe response message includes a second signal strength of the second bridge node. The wireless network device compares the first signal strength to the second signal strength. Conditioned on determining that the second signal strength is greater than the first signal strength, the first network interface is disconnected from the first bridge node in the first wireless network. The first network interface is connected to the second bridge node, the first network interface to operate as a station in the third wireless network.

Particular implementations may include one or more of the following features. The beacon message may include a first hop count, the first hop count indicating a first number of hops to reach an external access point following a first network path through the first bridge node. The probe response message may include a second hop count, the second hop count indicating a second number of hops to reach the external access point following a second network path through the second bridge node. Conditioned on determining that the second signal strength is equivalent to the first signal strength the wireless network device may compare the first hop count to the second hop count. Conditioned on determining that the second hop count is less than the first hop count, the first network interface may be disconnected from the first bridge node in the first wireless network, and the first network interface may be connected to the second bridge node, the first network interface to operate as a station in the third wireless network.

Transmitting the beacon message may comprise examining operational parameters of the wireless network device. Based on the examination, a determination may be made that a periodic network scan is enabled. In response to the determination, a timer may be started. The beacon message may be transmitted upon expiration of the timer. A value of the timer may be configurable by a user.

Transmitting the beacon message may comprise determining, by the wireless network device, that the first signal strength is below a threshold value. In response to the determination, the beacon message may be transmitted.

The wireless network device may determine that the second signal strength is below the threshold value. In response to determining that the second signal strength is below the threshold value and conditioned on determining that the second signal strength is greater than the first signal strength, the first network interface may be disconnected from the first bridge node in the first wireless network and connected to the second bridge node, the first network interface to operate as a station in the third wireless network. A new beacon message, which includes the second signal strength of the second bridge node, may be transmitted.

Transmitting the beacon message may comprise determining, by the wireless network device, failure in message transmission from the first network interface through the first bridge node. In response to the determination, the beacon message may be transmitted.

Based on connecting the first network interface to the second bridge node to operate as the station in the third wireless network, a new beacon message, which includes the second signal strength of the second bridge node, may be transmitted through the second network interface.

The wireless network device may be configured to operate as a bridge node between the first wireless network and the second wireless network. The wireless network device may determine that the wireless network device is enabled to operate as a bridge node. Based on the determination, the beacon message may be transmitted.

The beacon message that includes the first signal strength of the first bridge node may be a first beacon message transmitted by the wireless network device. A second beacon message may be transmitted through the second network interface operating as the access point in the second wireless network. The second beacon message may include (i) a first hop count, the first hop count indicating a first number of hops to reach an external access point following a first network path through the second bridge node and (ii) a first identifier for a head bridge node that is directly connected to the external access point in the first network path. A new response message from the second bridge node may be received at the second network interface. The new response message may include (i) a second hop count, the second hop count indicating a second number of hops to reach the external access point following a second network path through the second bridge node and (ii) a second identifier for a head bridge node that is directly connected to the external access point in the second network path. The wireless network device may determine that the first identifier for the head bridge node in the first network path is same as the second identifier for the head bridge node in the second network path. Based on the determination, the wireless network device may compare the first hop count to the second hop count. Conditioned on determining that the second hop count is greater than the first hop count, information about a third bridge node operating as an access point in a fourth wireless network may be obtained. The first network interface may be disconnected from the second bridge node in the third wireless network. The first network interface may be connected to the third bridge node, the first network interface to operate as a station in the fourth wireless network.

The beacon message may include (i) a first hop count, the first hop count indicating a first number of hops to reach an external access point following a first network path through the first bridge node and (ii) a first identifier for a head bridge node that is directly connected to the external access point in the first network path. A response message may be received at the second network interface from a third bridge node that operates as an access point in a fourth wireless network, the response message including (i) a second hop count, the second hop count indicating a second number of hops to reach the external access point following a second network path through the third bridge node and (ii) a second identifier for a head bridge node that is directly connected to the external access point in the second network path. The wireless network device may determine that the first identifier for the head bridge node in the first network path is same as the second identifier for the head bridge node in the second network path. Based on the determination, the first hop count may be compared to the second hop count. Conditioned on determining that the second hop count is greater than the first hop count, the response message from the third node may be discarded without connecting to the third bridge node.

Implementations of the above techniques include methods, devices, computer program products and systems for performing the above-described actions. Such a computer program product can be suitably embodied in a non-transitory machine-readable medium that stores instructions executable by one or more processors. The instructions are configured to let the one or more processors to perform the above-described actions. One such system includes a plurality of bridge devices, each of which is configured to perform the above-described actions, and one or more IoT network devices. One such device includes one or more processors, and a storage medium storing instructions that, when executed by the one or more processors, are configured to cause the one or more processors to perform the above-described actions.

The bridge as disclosed herein can be customized for application to IoT network devices. The bridge can be configured using similar configuration routines used to configure the IoT network devices. The bridge can be built into a device with co-located host functionality, e.g., a smart plug with a universal serial bus (USB) charger, or a built-in smart sensor. The bridge can be built at a low cost compared to other similar devices used in the industry.

The techniques described herein for updating the network connections can be used to find the best route from a bridge to the external AP. These techniques, which are referred to as "auto link." are utilized by bridge devices to find the best upstream nodes, link to each other automatically and construct an optimized network connecting bridge devices to the external AP. A bridge device can use the auto link techniques to configure and reconfigure network paths automatically during run time, either through periodic scans or upon detection of changes in existing network paths.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 6A and 6B illustrate examples of dead loops formed in a wireless network, according to one or more implementations.

DETAILED DESCRIPTION

Network devices in a wireless network can be connected to each other through a central access point (AP), e.g., in an infrastructure mode of the wireless network. Some of the network devices may not receive a strong signal from the AP. e.g., due to distance from the AP, signal obstruction, or signal interference. The signal issue may be exacerbated for IoT network devices, which can have limited signaling capabilities for their transceivers. A bridge can be positioned to provide a strong signal to the IoT network devices, and used to connect the IoT network devices to the wireless network.

In this context, a wireless network as described in the following sections refers to a wireless local area network (WLAN) or a Wi-Fi network that is based on the IEEE 802.11 family of wireless protocols. However, the systems and techniques disclosed herein can also be applied to wireless networks based on other communications standards.

An IoT network device refers to an information-sensing device, e.g., a Radio Frequency Identification (RFID) apparatus, an infrared radial sensor, a Global Positioning System (GPS) device, a laser printer or scanner, among others. The IoT network device includes a network interface and is capable of being connected to other local IoT network devices, e.g., through a WLAN, and/or to remote IoT network devices, e.g., through the Internet. By connecting various IoT network devices through a network, the IoT devices can be managed remotely for sharing information collected by the various IoT network devices, and/or the operations of the IoT network devices can be controlled based on the shared information.

A bridge as disclosed herein is a storage/forwarding network device that is configured to connect two or more wireless networks, such as two WLANs. A bridge can split a large wireless network into multiple network segments, or interconnect two or more wireless networks into a logical group, so that all connected network devices are allowed to access a resource located in one of the constituent wireless networks. The bridge forwards frames between the multiple network segments or wireless networks by performing address translation at the data link layer. A bridge used in a WLAN or Wi-Fi network is also referred to as a Wi-Fi bridge.

Figure 1:
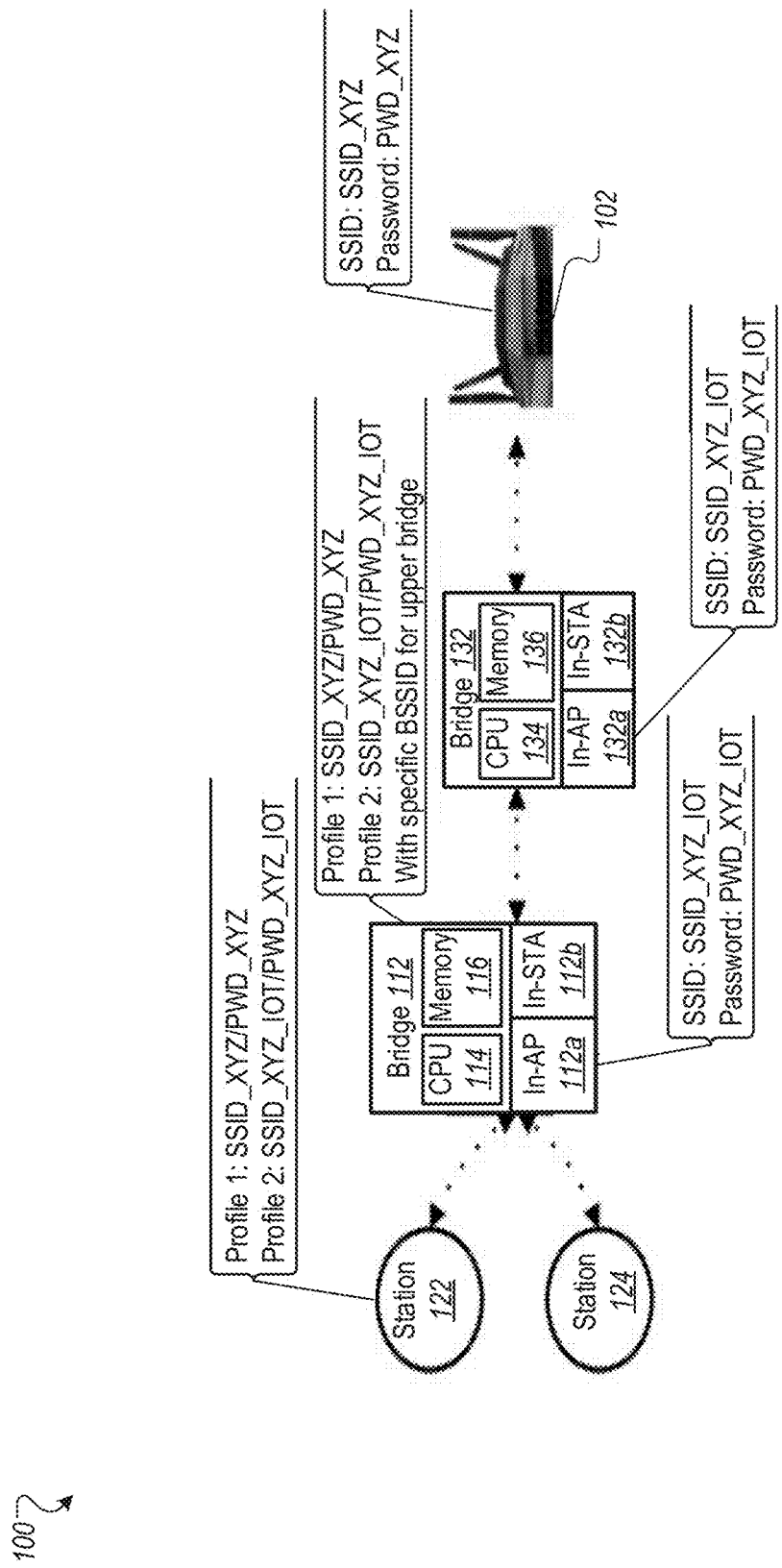
FIG. 1 illustrates an example of a system with multiple bridges for wirelessly connecting network devices, according to one or more implementations.

FIG. 1 illustrates an example of a system 100 with multiple bridges for wirelessly connecting network devices, according to one or more implementations. The system 100 includes a wireless network with an AP 102, one or more network devices, e.g., station 122 and station 124, and one or more bridge devices, e.g., bridge 112 and bridge 132.

In some implementations, the wireless network associated with the AP 102 is based on an IEEE 802.11 wireless network standard, and is operating in an infrastructure mode, e.g., various network devices in the wireless network establish wireless connections with the AP 102 and communicate with other network devices using the AP 102 as an intermediate node. The AP 102 is a network device that is configured to act as a base station for the wireless network. The AP 102 transmits to and/or receives from, other network devices in the wireless network, wireless radio frequency (RF) signals to facilitate communication with and among the network devices. In some implementations, the AP 102 is a wireless router that is configured to route data and control packets between network devices.

Network devices that send and/or receive data in the wireless network are referred to as stations in the wireless network. For example, the network devices 122 and 124 are stations in the wireless network. In some implementations, the stations 122, or 124, or both, are IoT network devices. Other stations can also be present in the wireless network, e.g., wireless mobile devices such as laptops, personal digital assistants, and smartphones, or fixed devices such as desktops and workstations that are equipped with a wireless network interface.

In some implementations, the stations 122 and 124 are outside the direct signal range of the AP 102. In such a case, the stations 122 and 124 are connected to the wireless network using one or more bridge devices, e.g., bridge 112 and bridge 132. For example, the bridge device 112 includes two network interfaces 112*a* and 112*b*. The bridge device 112 is configured with functionality to create an internal wireless network and use one network interface, e.g., network interface 112*a*, as an access point in the internal wireless network. The bridge device 112 is also configured with functionality to act as a station in another wireless network, e.g., the wireless network with the AP 102, using another network interface, e.g., network interface 112*b*. The bridge device 112 is configured to simultaneously operate one network interface (e.g., network interface 112*a*) as an access point in an internal wireless network generated by the bridge, and operate another network interface (e.g., network interface 112*b*) as a station in an external wireless network.

Although FIG. 1 shows the bridge device 112 creating one internal wireless network as described above, in some implementations a bridge can create multiple internal wireless networks. In such implementations, the bridge can be associated with different network interfaces belonging to the different internal wireless networks, configuring each network interface to act as an access point for the respective internal wireless network.

In some implementations, the functionality of the wireless network access point or the wireless network station are implemented as separate firmware packages in the hardware device 112. However, in other implementations, the functionality of the wireless network access point and the wireless network station are implemented in the same firmware package in the hardware device 112

In some implementations, the bridge device 112 is a single system-on-a-chip (SoC) with a built-in microcontroller unit, such as a central processing unit (CPU) 114, and a memory device 116. The CPU 114 can be a microprocessor or other suitable processor, and the memory device 116 can be a flash memory device, a read-only memory (ROM) device, an Electrically Erasable Programmable Read Only Memory (EEPROM) device, a hard disk, or other suitable storage device. The firmware packages corresponding to the bridge features of the hardware device, e.g., the firmware packages for the wireless network access point and the wireless network station functionalities of the bridge, include instructions that are stored in the memory device 116. The CPU 114 is configured to execute the instructions encoded by the firmware packages to provide the wireless network access point functionality and the wireless network station functionality.

In some implementations, when the instructions for the access point functionality are executed, the bridge 112 forms an internal wireless network within a limited geographic proximity of the bridge using the network interface 112*a*, which is configured to act as the AP for the internal wireless network. The network devices 122 and 124 are within the geographic range covered by the bridge 112, such that they can receive a strong RSSI (Received Signal Strength Indication) for the internal wireless network from the network interface 112*a* (e.g., over a certain acceptable signal threshold). The network devices 122 and 124 accordingly connect to the network interface 112*a* access point, and thereby act as stations in the internal wireless network formed by the bridge 112.

The bridge 112 is able to receive signal from the AP 102. In some implementations, when the instructions for the wireless station functionality are executed, the bridge 112 connects, through the network interface 12*b*, to the AP 102 as a station in the external wireless network associated with AP 102. The bridge 112 forwards bidirectional data between the stations 122, 124 and the AP 102 through the network interfaces 112*a* and 112*b*. In this manner, the bridge 112 connects the stations 122 and 124 to the external wireless network associated with AP 102, with the bridge 112 as an intermediate network node.

As described above and in the rest of this disclosure, the larger wireless network in which various stations and the bridges are present is referred to as the external wireless network, and a base station in the external wireless network is referred to as an external access point (Ext-AP). For example, the wireless network in which AP 102 is the access point is the external wireless network in the system 100, and AP 102 is the Ext-AP. Local wireless networks formed by a bridge at one or more of interfaces of the bridge are referred to as internal wireless networks of the bridge. A bridge network interface that provides the access point functionality for an internal wireless network is referred to as an internal AP (In-AP) interface of the bridge. In the example above, the network interface 112*a* is an In-AP interface of the bridge 112. A network interface of the bridge that connects as a station to the external wireless network is referred to as an internal station (In-STA) interface of the bridge. In the example above, the network interface 112*b* is an In-STA interface for the bridge 112 that connects to external wireless network through the Ext-AP 102.

In some implementations, the bridge 112 is not directly connected to the Ext-AP 102. Instead, the bridge 112 connects to the Ext-AP 102 through one or more other bridges, e.g., bridge 132. This may be the case, for example, when the location of the bridge 112 is such that the RSSI from the Ext-AP 102 is below an acceptable signal threshold of the bridge 112. The upstream bridge device 132 is configured in a manner similar to the bridge 112 as described above. The bridge device 132 includes a CPU 134 and a memory device 136. The CPU 134 executes instructions encoded in the bridge firmware package(s) that are stored in the memory 136. By executing the instructions, the CPU 114 configures the bridge 136 to form its own internal wireless network through the network interface 132*a* and/or to connect as a station to the Ext-AP 102 through a second network interface 132*b*. Accordingly, network interface 132*a* is the In-AP interface for the bridge 132, while network interface 132*b* is the In-STA interface for the bridge 132.

The bridge 112 connects to the internal wireless network of the bridge 132 by connecting, through the In-STA interface 112*b* of the bridge 112, as a station to the In-AP interface 132*a* of the bridge 132. In this manner, two or more bridges can be connected in a chained or stacked configuration, and thereby used to connect network devices that are at a distance away from the Ext-AP 102, e.g., stations 122 and 124.

Although FIG. 1 shows only two network devices 122 and 124 in the system 100, additional network devices can also be present, including additional IoT network devices. In some implementations, different network devices are connected to different bridges. For example, one or more network devices, including IoT network devices, can be connected to the bridge 132, in addition to the network devices 122 and 124 connected to the bridge 112.

In some implementations, an identifier is associated with each wireless network in the system 100, which is called a service set identifier (SSID) for the wireless network. The SSID for a wireless network can be an alphanumeric string. For example, the SSID for the external wireless network can be SSID_XYZ, as shown. In some implementations, a password is also associated with the each wireless network. For example, the password for the external wireless network can be PWD_XYZ, as shown. The Ext-AP 102 is configured with the SSID and the password. A network device that attempts to connect to the external wireless network by connecting to the Ext-AP 102 will have to provide the SSID and the correct password to establish a successful connection. However, in some implementations, a password may not be associated with the external wireless network. In such cases, a network device will have to provide only the SSID to connect to the Ext-AP 102.

In some implementations, an internal wireless network formed by a bridge is configured with an SSID and a password that are derived from the SSID and password of the external wireless network, respectively. For example, the SSID and password for the internal wireless network formed by the bridge 112 are configured to be SSID_XYZ_IOT and PWD_XYZ_IOT, respectively, which are associated with the In-AP interface 112*a*. A network device (e.g., station 122 or 124) that attempts to connect to the In-AP interface 112*a* to access internal wireless network of the bridge will have to provide SSID_XYZ_IOT and password PWD_XYZ_IOT to establish a successful connection.

Similarly, the SSID and password for the internal wireless network formed by the bridge 132 are configured to be SSID_XYZ_IOT and PWD_XYZ_IOT respectively, which are associated with the In-AP of the interface 132*a*. A network device (e.g., In-STA interface 112*b* of the bridge 112) that attempts to connect to the In-AP interface 132*a* to access the internal wireless network of the bridge 132 will have to provide SSID_XYZ_IOT and password PWD_XYZ_IOT to establish a successful connection.

In some implementations, a password is not associated with the internal wireless network formed by the bridge 112. This may be the case, for example, when a password is not associated with the external wireless network. In such cases, a network device provides only the correct SSID to connect to the In-AP interface 112*a* or 132*a*, as applicable.

The SSID associated with a bridge can be hidden. In such a case, a network device may not be able to discover the wireless network formed by the bridge. The network device can connect to the hidden wireless network only if the device is specifically configured with the corresponding SSID and password.

A network device in the system 100 is configured with one or more profiles, where a profile specifies the SSID of a wireless network to which the network device can connect. The profile also includes a password for the wireless network, if such a password is configured at the access point of the network. In some implementations, each network device in the system 100 is configured with two or more profiles. One of the profiles specifies the SSID and password of the external wireless network. One or more of the other profiles specifies the SSID and password associated with an internal wireless network of a bridge. For example, as shown, the network device 122 is configured with two profiles, Profile 1 and Profile 2. Profile 1 specifies SSID_XYZ and PWD_XYZ, which correspond to the SSID and password respectively of the external wireless network. Profile 2 specifies SSID_XYZ_IOT and PWD_XYZ_IOT, which correspond to the SSID and password respectively of an internal wireless network formed by a bridge (e.g., bridge 112 or 132).

Each bridge in the system 100 is configured with two or more profiles. A first profile specifies the SSID and password of the external wireless network. A second profile specifies the SSID and password corresponding to an internal wireless network formed by an upstream bridge. For example, as shown, the bridge 112 is configured with two profiles, Profile 1 and Profile 2. Profile 1 specifies SSID_XYZ and PWD_XYZ, which correspond to the SSID and password respectively of the external wireless network. Profile 2 specifies SSID_XYZ_IOT and PWD_XYZ_IOT, which correspond to the SSID and password respectively of an internal wireless network formed by an upstream bridge, e.g., bridge 132. The bridge 112 uses Profile 2 to connect to the internal wireless network that is formed by the bridge 132 in a stacked configuration described above. In such a case, Profile 2 of the bridge 112 includes the data link layer address (e.g., the medium access control (MAC) address) of the In-AP interface 132*a*, which is referred to as the basic service set identifier (BSSID) of the In-AP interface 132*a*. In some implementations, each network device and bridge in the system 100 is configured with similar profiles automatically using a smart configuration, which is described in greater detail below.

In some implementations, the internal wireless network formed by each bridge is configured with the same SSID and password. For example, the internal wireless network formed by bridge 112 at the In-AP interface 112*a* is configured with SSID_XYZ_IOT and password PWD_XYZ_IOT. Similarly, the internal wireless network formed by bridge 132 at the In-AP interface 132*a* is also configured with SSID_XYZ_IOT and password PWD_XYZ_IOT. This may be useful, for example, to allow a network device to connect to one of several internal wireless networks. For example, the network device 122 can be mobile, and can move from the internal wireless network formed by the bridge 112 to the internal wireless network formed by the bridge 132. In such a case, network device 122 can use Profile 2 to connect to the internal wireless network formed by either bridge. However, network device 122 will also have to know the BSSID associated with the In-AP interface 112*a* or the in-AP interface 132*a*, to connect to the respective internal wireless networks. In some implementations, a network device is configured to automatically connect to a bridge with a stronger RSSI (Received Signal Strength Indication).

In some implementations, one or more bridges in the system 100 also host application-level functionality. For example, the bridge 112 can be configured with functionality of a smart plug with a USB charger, or a smart sensor, or other suitable application. The functionality of the hosted application can be implemented as a firmware package stored in a memory device coupled to the bridge device, e.g., memory device 116. The device processor, e.g., CPU 114, can execute instructions encoded by the host application firmware package to provide the application features.

In this context, a smart plug refers to an electrical plug that is provided with a built-in Wi-Fi module. The smart plug can be configured through a remote application, e.g., a smartphone application, which can set threshold values for the ON/OFF current of the plug, and/or set automatic startup/shutdown of the plug remotely. A smart sensor refers to a sensor that is provided with a microprocessor, and has the capability to capture, process, and exchange information sensed by the sensor. A USB charger refers to a device that includes an USB interface configured for charging electrical appliances. The USB charger uses a data cable as a power cable and starts charging when plugged into the devices, such as a computer. The USB charger can also be equipped with a current transformer, with an output being the USB interface, and can be used for charging all electrical appliances equipped with a standard interface.

In the above manner, a bridge, e.g., bridge 112, forms an internal wireless network with a network interface acting as the access point for the internal wireless network, and connects as a station to an access point in an external wireless network. The bridge is configured with the capability to forward wireless frames that include control and data information in the directions including: (i) from a station connected to an internal wireless network to another station connected to an internal wireless network, e.g., from network device 122 to network device 124 or vice versa; (ii) from a station (e.g., network device 122 or 124) to the application hosted by the bridge; (iii) from a station (e.g., network device 122 or 124) to a station in the external wireless network (e.g., through the Ext-AP 102); (iv) from a station in the external wireless network (e.g., through the Ext-AP 102) to the application hosted by the bridge; and (v) from a station in the external wireless network (e.g., through the Ext-AP 102) to a station in an internal wireless network of the bridge. In the implementations described herein, a wireless frame refers to a WLAN frame, e.g., based on an IEEE 802.11 standard. However, in other implementations, other types of wireless frames also can be used.

To perform the forwarding function, the In-STA interface of the bridge (e.g., network interface 112b) is configured to be aware of the existence of all stations in the internal wireless network of the bridge (e.g., network devices 122 and 124), and stations in the external wireless network. This is achieved by creating entries for the network layer addresses (e.g., Internet Protocol (IP) addresses) and data link layer addresses (e.g., MAC addresses) of stations in the internal wireless networks in the bridge table maintained by the bridge 112. Other bridges in the system 100, e.g., bridge 132, are configured with bridge tables in a similar manner.

The following sections describe IP addresses as representative examples of network layer addresses and MAC addresses as representative examples of data link layer addresses. However, other types of network layer addresses and data link layer addresses can also be used with the systems and techniques described below.

A station in the external wireless network needs to know the MAC address of the In-STA interface of the bridge (e.g., network interface 112b) to forward packets to a station that is connected to an internal wireless network of the bridge. In a table maintained by the access point in the external wireless network (e.g., Ext-AP 102), the IP addresses of all stations that are connected to the internal wireless network of the bridge (e.g., network devices 122 and 124) are mapped to the MAC address associated with the In-STA interface of the bridge (e.g., 112b).

In some implementations, each station in the system 100 (e.g., network device 122 or 124) and each bridge (e.g., bridge 112 or 132) is configured to support one or more of IEEE 802.11a, IEEE 802.11b, IEEE 802.11g or IEEE 802.11n communication standards, among other suitable communication protocols. In some implementations, each bridge, e.g., 112 or 132, is configured to support a plurality of IoT network devices that are connected as stations to the internal wireless network formed by the bridge. For example, bridge 112 can be configured to support ten or more IoT network devices that are connected to the wireless network simultaneously formed by the In-AP interface 112a.

Figure 2:
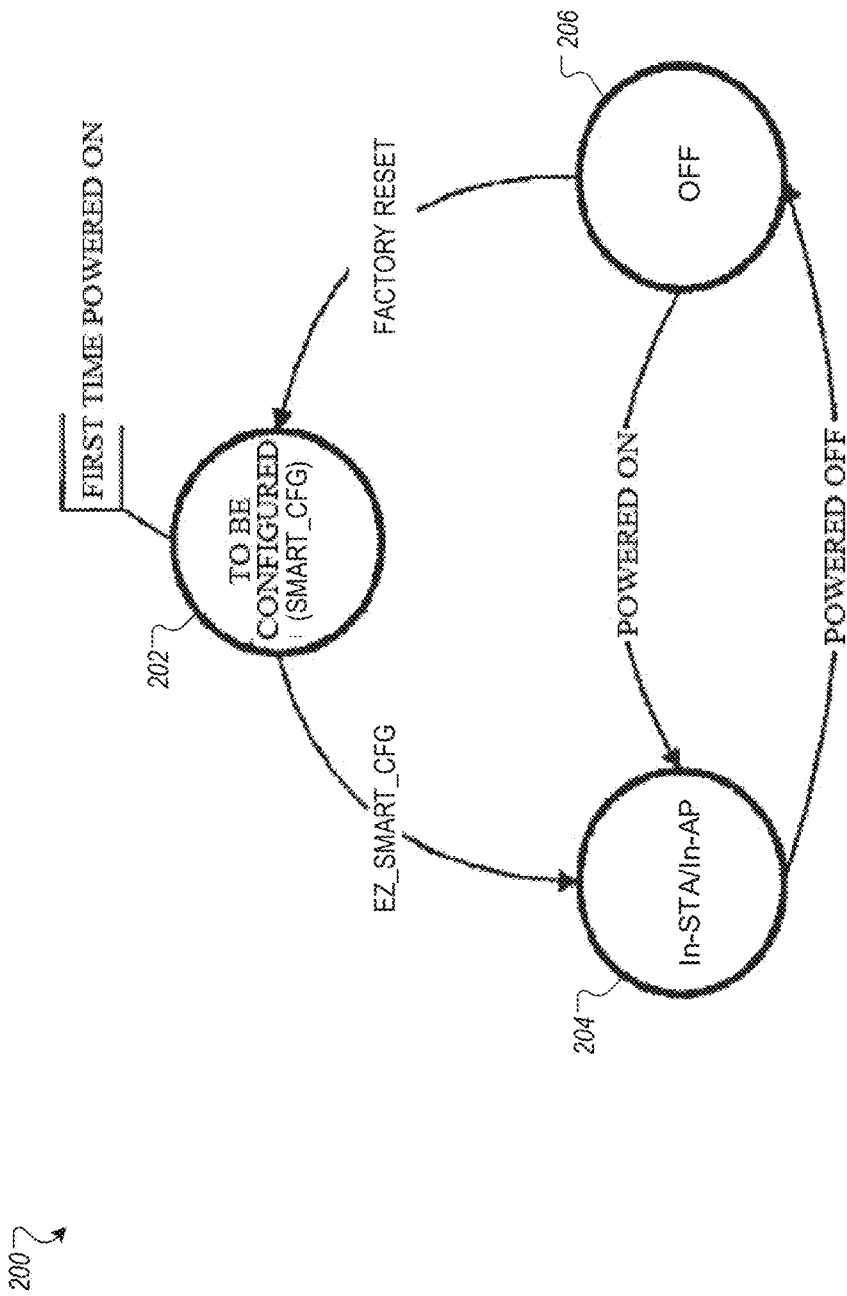
FIG. 2 illustrates an example of a state diagram for the operation of a bridge, according to one or more implementations.

FIG. 2 illustrates an example of a state diagram 200 for the operation of a bridge, according to one or more implementations. The state diagram 200 can be applied to the bridge 112 (and/or the bridge 132). Accordingly, the following section describes the state diagram 200 with respect to the bridge 112. However, the state diagram 200 is also applicable to other bridges.

When the bridge 112 is initially powered on, the bridge is in state 202, where the bridge is ready to be configured with network parameters corresponding to the internal wireless network to be formed by the bridge and profiles for other wireless networks that the bridge can connect to. In some implementations, a configuration routine is executed to set the network parameters for the bridge 112. The configuration routine is encoded as one or more instructions that are stored in a storage medium coupled to the bridge device, e.g., memory 116. A microcontroller associated with the bridge device, e.g., CPU 114, executes the one or more instructions to run the configuration routine.

The configuration routine places the bridge device in a smart configuration mode (e.g., "smart_cfg" as shown in FIG. 2) at initial power on in the state 202. The configuration routine obtains a configuration profile for the bridge 112, which includes the SSID of the Ext-AP 102, and also a password of the Ext-AP 102, if a password is present. In some implementations, SSID and password of the Ext-AP 102 are obtained by the bridge device by interacting with an external network device, e.g., a smartphone connected to the Ext-AP 102 in the external wireless network. In some implementations, the bridge device connects to the external network device through wireless channels. e.g., in the external wireless network. However, in some implementations, the bridge device connects to the external network device through alternative connection mechanisms, such as short-range wireless connections, e.g., Bluetooth™. The configuration routine running on the bridge device downloads the SSID and password of the Ext-AP 102 from the external network device once a connection is established, and saves the configuration profile for the bridge in a storage medium coupled to the bridge device, e.g., memory 116.

The configuration routine then generates the SSID and password for an internal wireless network of the bridge. In some implementations, the configuration routine sets the access point parameters for the bridge to require a password when the In-AP is operational. As described previously, the configuration module can derive the SSID and password for the internal wireless network based on the SSID and password of the Ext-AP 102. For example, if the SSID of the Ext-AP 102 is SSID_XYZ, the SSID of the bridge is set to be SSID_XYZ_IOT. If the Ext-AP 102 has a password, e.g., PWD_XYZ, then the password of the bridge is set to be PWD_XYZ_IOT. However, if the Ext-AP 102 does not have a password, then the password of the bridge is set to be PWD_IOT. In some implementations, the configuration module can add different suffix instead of "IOT" and default password of internal wireless network, based on end user's configuration such as input from a remote device (e.g., a smart phone). The configuration routine saves the generated SSID and password for the internal wireless network of the bridge in a storage medium coupled to the bridge device, e.g., memory 116, and then disables the smart configuration mode of the bridge, which then transitions to state 204.

In state 204, the configuration routine creates an internal wireless network for the bridge 112, e.g., using the access point firmware package of the bridge. The configuration routine associates the internal wireless network with a network interface of the bridge, e.g., network interface 112a. The configuration routine creates the functionality of the In-AP in the associated network interface 112a, and sets the generated SSID and password for the internal wireless network as network parameters of the In-AP interface 112a.

The configuration routine also enables the wireless station functionality for the bridge at a second network interface, e.g., In-STA interface 112b, using the wireless station firmware package of the bridge. The In-STA interface 112b scans for available wireless access points (e.g., Ext-AP 102) or bridges (e.g., bridge 132) that match the SSID specified by the profiles known to the bridge 112, e.g., SSID_XYZ or SSID_XYZ_IOT. The configuration routine selects the wireless access point or bridge with a matching SSID that returns the strongest RSSI based on the scanning.

After the In-STA interface 112b successfully establishes a connection with an external access point or another bridge, the In-AP functionality of the network interface 112a is automatically actuated in firmware, and the generated SSID and password for the internal wireless network are set for the In-AP interface. The bridge then commences normal operation, e.g., forwarding traffic between stations connected to its internal wireless network and stations in the external wireless network.

In some implementations, the configuration routine creates an information element (IE) that is included by the bridge 112 when the bridge 112 sends out beacon frames or probe response frames. Similar information elements are present in beacon frames or probe response frames received by the bridge from other bridge devices. The configuration routine saves the IE for the bridge in a storage medium coupled to the bridge device, e.g., memory 116.

In this context, a beacon frame, also referred to as a beacon message, is a management frame in IEEE 802.11 based wireless networks. Beacon messages are transmitted periodically by an access point to announce the presence of a wireless LAN corresponding to the access point. For example, the In-AP interface 112a of the bridge 112 periodically transmits beacon messages to announce the internal wireless network created by the bridge 112. The beacon message includes all the information about the internal wireless network and the corresponding In-AP interface 112a, e.g., timestamp, SSID, and other parameters regarding the access point. Wireless network interfaces of other devices continually scan all the wireless radio channels and listen to beacon frames as the basis for choosing which access point is best to associate with.

In some implementations, a station sends a probe request frame, also referred to as a probe request message, when the station needs to obtain information from another station or an access point. For example, the in-STA interface 112b of the bridge 112 can send a probe request message to determine which access points are within range. A station or access point will respond with a probe response frame, also referred to as a probe response message, when the station or access point receives a probe request message. For example, the In-AP interface 132a of the bridge 132 can send a probe response message when the In-AP interface 132a receives a probe request message from the In-STA interface 112b of the bridge 112. The probe response message includes capability information, supported data rates, among others, of the network device that generated the probe response message, e.g., the In-AP interface 132a.

In this context, an information element (IE) refers to a portion of a wireless frame exchanged between the bridge devices in the wireless network to create and manage the wireless links. The IE is included in beacon messages, probe request messages, and/or probe response messages. As described in detail in the following sections, an IE, as used by the bridges in the wireless networks disclosed herein, includes one or more fields that provide information on various parameters associated with the corresponding bridge, e.g., the associated SSID, RSSI of the upstream bridge device, or hop count to the Ext-AP, among others.

If the bridge 112 also hosts an application functionality, the configuration routine configures the network parameters for the hosted application when the In-STA interface 112b connects to the external access point or another bridge. For example, the host application may include network layer and transport layer features, such as a Transmission Control Protocol/Internet Protocol (TCP/IP) network stack. In such a case, the configuration routine activates a DHCP client in the host to acquire an IP address for the host by communicating with a DHCP server that is accessible through the external wireless network.

If the bridge 112 is powered off, then the bridge transitions to the state 206, in which the bridge is inactive. If the bridge 112 is subsequently powered on, the bridge transitions back to the state 204. Since the network parameters for bridge are already configured as described above, the configuration routine skips the initial smart configuration for the bridge. Instead, as described above, the configuration routine activates the In-STA interface 112b, which is connected to the Ext-AP 102 or bridge 132, and actives the In-AP interface 112a, after which the bridge resumes normal operation. If a host application is present, the host application is also configured as described above.

If a factory reset is performed on the bridge 112 in state 206, then the saved network parameters for the bridge are erased. Accordingly, the bridge transitions back to the state 202, in which the configuration routine determines network parameters for the bridge device using the smart configuration mode, as described previously.

As described previously, during initial configuration and setup, the bridge 112 performs a scan for the Ext-AP 102, or the In-AP interfaces of other bridge devices, in state 204 of the configuration routine. The bridge 112 establishes an initial connection to the Ext-AP 102, or to an upstream bridge device, e.g., to the In-AP interface 132a of bridge 132, depending on one or more connection parameters, e.g., which RSSI is stronger. Subsequently, during regular operation, the bridge 112 periodically checks for a better connection to the Ext-AP 102 compared to its present upstream connection. For example, if the bridge 112 connects to the Ext-AP 102 through the upstream bridge 132, then the bridge 112 checks if a connection to the Ext-AP 102 through another bridge, or a direct connection to the Ext-AP 102, is available. Additionally or alternatively to the periodic scans, various events can trigger the bridge 112 to check for alternative connections. Such events include, for example, a failure of one or more links on the present upstream connection to the Ext-AP 102, reduced transmission efficiency on the present connection (e.g., reduction in data transmission throughput), or receiving beacon messages from a new bridge device with a stronger RSSI, among others.

In some implementations, the bridge 112 performs the periodic scan for better connections if an auto link feature is enabled on the bridge. In some implementations, the auto link feature can be enabled or disabled by a corresponding auto link parameter in the configuration settings of a bridge device. The configuration settings of the bridge device can be stored in a storage medium coupled to the bridge device, e.g., memory 116.

In some implementations, auto link can be enabled by setting the corresponding auto link parameter only if bridge mode is also enabled on the device, e.g., the functionality of the In-AP is enabled on one network interface of the bridge (e.g., In-AP interface 112a or 132a of the bridge 112 or 132 respectively), and the wireless station functionality is enabled at a second network interface for the bridge (e.g., In-STA interface 112b or 132b of the bridge 112 or 132 respectively). In such implementations, when an attempt is made to set the auto link parameter, e.g., by a user, the configuration routine of the bridge first checks whether the In-AP functionality is enabled on at least one network interface of the bridge and the wireless station functionality is enabled on at least another network interface for the bridge. If the In-AP functionality and wireless station functionalities are enabled for the bridge, then the auto link parameter is allowed to be set to a value that enables the auto link feature for the bridge.

When auto link is enabled, the In-AP interface of the bridge, e.g., In-AP interface 112a of the bridge 112, includes an IE, as described previously and further described in the following sections, in the beacon and probe response messages that the In-AP interface of the bridge sends. In some implementations, the bridge periodically scans for better upstream connections. In some implementations, the bridge performs the periodic scan if a scan condition parameter is enabled (e.g., set to a numeric value 1 or some other suitable value) in the configuration settings of the bridge. When the scan condition parameter is enabled, the bridge starts a timer to measure the time interval between periodic scans. The time interval can be any suitable temporal value, e.g., 100 seconds or 300 seconds, among others. In some implementations, the time interval value is configurable. For example, a user configuring the bridge device 112 can set the timer to a suitable value by accessing a time interval parameter in the configuration settings of the bridge device. In some implementations, the user can access the configurations settings of the bridge device through a user interface provided by the bridge device.

In some implementations, an additional configuration parameter can provide options as to when the timer is started. For example, the timer can be started only if the current upstream link for the bridge device is poor, e.g., the signal level for the upstream access point to which the bridge is connected is below a certain threshold signal value. In such implementations, the bridge performs the scan when the signal level for the upstream link deteriorates below the threshold signal value. Alternatively, the timer can be run periodically irrespective of the condition of the upstream link. In such cases, the bridge performs the scan at regular periodic intervals.

When the timer expires, the bridge device triggers a scan of the neighborhood. The scan can be performed in the current wireless channel that the bridge uses to connect to the upstream bridge device. However, the wireless channel for the scan can also be set to a different channel, e.g., by changing the value of a channel parameter in the configuration settings of the bridge device.

In some implementations, the bridge device transmits a beacon message, which includes the SSID of the Ext-AP, along with one or more connection parameters for the existing upstream connection of the bridge device. For example, the In-AP interface 112a of the bridge 112 broadcasts a beacon message that includes the SSID of the Ext-AP 102. The beacon message also includes signal strength (e.g., RSSI) of the upstream bridge node. e.g., RSSI of the In-AP interface 132a, and/or a hop count from the bridge 112 to the Ext-AP 102 through the bridge 132, among other connection parameters.

Additionally or alternatively, in some implementations, when the timer expires, the bridge device transmits several probe request messages, seeking response messages from other devices in the neighborhood of the bridge device. The probe request messages include the SSID of the Ext-AP or the SSID of the In-AP respectively, along with one or more connection parameters for the existing upstream connection of the bridge device. For example, the In-STA interface 112b of the bridge 112 broadcasts probe request messages that include the SSID of the Ext-AP 102, and the SSID of the In-AP interface 132a of the bridge 132. The probe request message also includes the signal strength (e.g., RSSI) of the upstream In-AP interface 132a, and/or a hop count from the bridge 112 to the Ext-AP 102 through the bridge 132, among other connection parameters.

In performing the periodic scan, the bridge device receives beacon messages from other bridge devices in the wireless network, and/or probe response messages from other bridge devices or IoT devices in the wireless network. The beacon messages and/or probe response messages received from other network devices include similar information. For example, the received beacon or probe response messages include the SSID of the Ext-AP. The received message also includes one or more connection parameters for the existing upstream connection of the bridge device sending the message.

In some implementations, the SSID of the Ext-AP, and the various connection parameters are fields of an IE included in the beacon message, probe request message and a probe response message. Table I shows the fields of the IE that is included in a beacon message, a probe request message, and a probe response message.

TABLE I

| ID | Length | OUI | SubID |
| --- | --- | --- | --- |
| Associated SSID | Associated BSSID | AID to Ext-AP | HopCount to Ext-AP |
| Good Count of link to Ext-AP | RSSI of upper node | Tx Rate to upper node | Rx Rate from upper node |

The "ID" field in the IE, as shown in Table I, refers to an identification for the IE. In some implementations, different ID values are used by different vendors producing the IoT devices, such as one or more of the bridge 112, bridge 132, station 122, or station 124, among others. In some implementations, the ID values are integer values, e.g., the ID value used by a vendor can be 221, or some other suitable integer.

The "Length" field in the IE, as shown in Table I, refers to the length of the IE payload. In some implementations, the Length is expressed in bytes.

The "OUI" field in the IE, as shown in Table I, denotes the Organizationally Unique Identifier (OUI) of a vendor or manufacturer of the IoT devices. The OUI is a 24-bit number that uniquely identifies the vendor or manufacturer, and is provided by the IEEE.

The "SubID" field in the IE, as shown in Table I, denotes a sub-identification for the IE. In some implementations, a vendor or manufacturer provides multiple IEs. In such cases, the SubID field is used to distinguish between the different IEs from the same vendor or manufacturer.

The "Associated SSID" field in the IE, as shown in Table I, denotes the SSID of the In-AP interface of the bridge device. For example. Associated SSID field in the IEs of the bridge devices 112 and 132 include the SSIDs of the In-AP interfaces 112a and 132a, respectively.

The "Associated BSSID" field in the IE, as shown in Table I, denotes the SSID of the In-AP interface of the upstream node, if any, to which the bridge device is connected as a station. For example, if the In-STA interface 112b of the bridge 112 is connected to the In-AP interface 132a of the bridge 132, then the Associated BSSID field in the IE of the bridge 112 indicates the SSID of the In-AP interface 132a. For a bridge device that is directly connected to the external access point, the Associated BSSID field in the IE indicates the SSID of the external access point. For example, the Associated BSSID field in the IE of the bridge 132, which is directly connected to the Ext-AP 102, denotes the SSID of the Ext-AP 102.

The "AID to Ext-AP" field in the IE, as shown in Table I, denotes the association ID (AID) of a head bridge node, which is a bridge device that is directly connected to the external access point in the current network path to the external access point. For example, if the network connection of the bridge 112 to the Ext-AP 102 is through the bridge 132 that is directly connected to the Ext-AP, then the AID to Ext-AP field in the IE of bridge 112 indicates the SSID of the In-AP interface 132a of bridge 132.

The "HopCount to Ext-AP" field in the IE, as shown in Table I, is a value that denotes the number of hops in the network path from the bridge device to the external access point. For example, if the network connection of the bridge 112 to the Ext-AP 102 is through the bridge 132, which is directly connected to the Ext-AP 102, then the HopCount to Ext-AP field in the IE of bridge 112 is set to the numeric value 2. This indicates that two hops are needed to reach the Ext-AP 102 from the bridge 112: a first hop from the bridge 112 to the bridge 132, and a second hop from the bridge 132 to the Ext-AP 102. For the IE of the bridge 132, the HopCount to Ext-AP field is set to the numeric value 1.

The "RSSI of upper node" field in the IE, as shown in Table I, denotes the wireless signal strength of the upstream node to which the station interface of the bridge device is connected. For example, if the network connection of the bridge 112 to the Ext-AP 102 is through the bridge 132, then the RSSI of upper node field in the IE of bridge 112 indicates the RSSI of the In-AP interface 132a of bridge 132.

The "Good Count of link to Ext-AP" field in the IE of a bridge device, as shown in Table I, is a value that denotes the number of good links in the network path of the bridge device to the external access point. In this context, a good link is one for which the RSSI of the upstream node is greater than a threshold signal value, e.g., −70 decibel-milliwatts (dBm) or −60 dBm, or some other suitable value. For example, if the network connection of the bridge 112 to the Ext-AP 102 is through the bridge 132 that is directly connected to the Ext-AP 102, where the RSSI of the In-AP interface 132a is greater than −70 dBm and the RSSI of the Ext-AP 102 is also greater than −70 dBm, then the Good Count of link to Ext-AP field in the IE of bridge 112 is set to the numerical value 2. For the IE of the bridge 132, the Good Count of link to Ext-AP field is set to the numerical value 1.

The "Tx Rate to upper node" field in the IE of a bridge device, as shown in Table I, denotes the data rate for wireless transmissions from the station interface of the bridge device to the upstream node of the bridge device. For example, if the In-STA interface 112b of the bridge 112 is connected to the In-AP interface 132a of the bridge 132, then the Tx Rate to upper node field in the IE of bridge 112 indicates the transmission data rate of the bridge 112 to the In-AP interface 132a.

The "Rx Rate from upper node" field in the IE of a bridge device, as shown in Table I, denotes the data rate for wireless transmissions to the station interface of the bridge device from an upstream node of the bridge device. For example, if the In-STA interface 112b of the bridge 112 is connected to the In-AP interface 132a of the bridge 132, then the Rx Rate from upper node field in the IE of bridge 112 indicates the transmission data rate from the In-AP interface 132a to the In-STA interface 112b.

Figure 3:
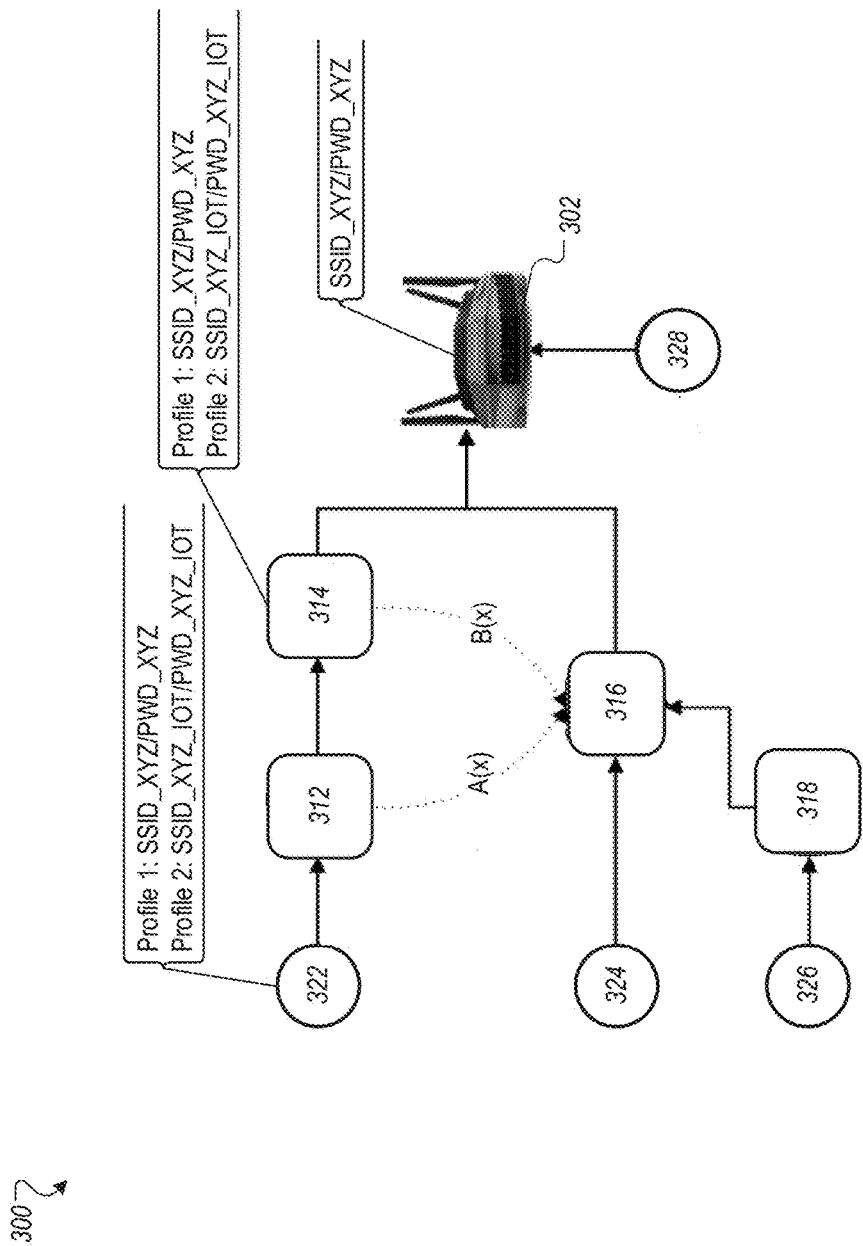
FIG. 3 illustrates an example of a system with multiple bridges using auto link to configure network connections dynamically, according to one or more implementations.

FIG. 3 illustrates an example of a system 300 with multiple bridges using auto link to configure network connections dynamically, according to one or more implementations. The system 300 includes a wireless network with an Ext-AP 302, one or more network devices, e.g., stations 322, 324, 326 and 328, and one or more bridge devices, e.g., bridges 312, 314, 316 and 318. In some implementations, the system 300 is similar to the system 100. For example, the AP 302 is similar to the Ext-AP 102; one or more of the bridge devices 312 and 318 are similar to the bridge device 112, and one or more of the bridge devices 314 and 316 are similar to the bridge device 132; and one or more of the stations 322, 324, 326 and 328 are similar to the station 122 (or the station 124).

Each of the bridge devices 312, 314, 316 and 318 establishes a respective internal wireless network, and they are also connected to the Ext-AP 302 in the external wireless network. One or more of the bridge devices establish network connections to the Ext-AP 302 through upstream nodes. For example, as shown, bridges 312 and 318 are connected to the Ext-AP 302 through upstream bridges 314 and 316, respectively. However, some of the bridge devices are directly connected to the Ext-AP 302. For example, bridges 314 and 316 are directly connected to the Ext-AP 302.

The bridges 312, 314, 316 and 318 use auto link to dynamically configure and reconfigure network connections to find the best route from the respective bridge device to the Ext-AP 302. As described previously, a bridge device uses auto link when operating in bridge mode (e.g., both In-AP interface and station interface are operational) and the auto link feature is enabled in the configuration settings of the bridge device.

When auto link is enabled, the bridge devices 312, 314, 316 and 318 include the IE, which is described above, in their respective beacon, probe request and probe response messages. A bridge device evaluates an upstream link using one or more connection parameters specified by the IE fields in a beacon or probe response message received from the upstream node, e.g., the RSSI of the upper node, HopCount to Ext-AP, Tx Rate to upper node, or Rx Rate from upper node. For example, the bridge 312 can receive beacon and/or probe response messages from the bridge 314 and/or the bridge 316. The bridge 312 will examine the values of IE fields in the respective beacon or probe response messages to evaluate the quality of the upstream link to the bridge 314 or the bridge 316, to connect to the Ext-AP 302.

By examining the IE fields, the bridge device determines whether the upstream link is good or bad. In some implementations, an upstream link is determined to be a good link if the RSSI for the upstream node is greater than a threshold signal value, e.g., −70 dBm. For example, the bridge 312 can decide that the upstream link to the bridge 314 is a good link when the RSSI of the In-AP interface of the bridge 314 is greater than −70 dBm. In some implementations, the threshold signal value is configurable, e.g., the threshold can be set to a suitable value by changing a signal strength parameter in the configuration settings of the bridge device.

Additionally or alternatively, an upstream link is determined to be a good link if the reception rate (Rx Rate) for data received from the upstream bridge is greater than a threshold reception data rate value, e.g., 2 Megabits per second (Mbps) or some other suitable value. For example, the bridge 312 can decide that the upstream link to the bridge 314 is a good link when the reception rate for data received from the In-AP interface of the bridge 314 is greater than 2 Mbps. In some implementations, the threshold reception data rate value is configurable, e.g., the threshold can be set to a suitable value by configuring a reception data rate parameter in the configuration settings of the bridge device.

Additionally or alternatively, an upstream link is determined to be a good link if the transmission rate (Tx Rate) for data transmitted to the upstream bridge is greater than a threshold transmission data rate value, e.g., 2 Megabits per second (Mbps) or some other suitable value. For example, the bridge 312 can decide that the upstream link to the bridge 314 is a good link when the transmission rate for data transmitted from the In-STA interface of the bridge 312 to the In-AP interface of the bridge 314 is greater than 2 Mbps. In some implementations, the threshold transmission data rate value is configurable, e.g., the threshold can be set to a suitable value by configuring a transmission data rate parameter in the configuration settings of the bridge device. In some implementations, the threshold reception data rate value is same as the threshold transmission data rate value. In other implementations, the threshold reception data rate value is different from the threshold transmission data rate value.

If there is more than one good upstream link available to a bridge device to connect to the external access point, then the bridge selects an upstream link based on comparing one or more parameters, e.g., the RSSI for the upstream bridge, the hop count to the external access point along the network paths through the available links, and a cumulative number of good upstream links along each network path to the external access point (e.g., the Good Count of link to Ext-AP). For example, the bridge device 312 may determine that the upstream links to the bridge 314 and the bridge 316 are both good links. In some implementations, the bridge 312 compares the RSSI of the In-AP interface of the bridge 314 to the RSSI of the In-AP interface of the bridge 316, where the two RSSI values are obtained from beacon or probe response messages received from the bridges 314 and 316, respectively (e.g., the RSSI of upper node field of the IE in the received messages). By comparing the RSSI values, the bridge 312 selects the upstream link for which the RSSI value is greater. If there are more than two good upstream links available, the bridge selects the link with the best RSSI value.

Additionally or alternatively, the bridge 312 compares the hop count to the Ext-AP 302 in the network path from the bridge 314 to the hop count in the network path from the bridge 316, where the two hop count values are obtained from beacon or probe response messages received from the bridges 314 and 316, respectively (e.g., the HopCount to Ext-AP field of the IE in the received messages). By comparing the hop counts, the bridge 312 selects the upstream link for which the hop count is lower. If there are more than two good upstream links available, the bridge selects the link with the lowest hop count value.

Additionally or alternatively, the bridge 312 compares the good count of links in the network path through the bridge 314 to the Ext-AP 302, to the good count of links in the network path through the bridge 316, where the two good count values are obtained from beacon or probe response messages received from the bridges 314 and 316, respectively (e.g., the Good Count of link to Ext-AP field of the IE in the received messages). As shown, the upstream links in the network path through the bridge 314 include a link from the bridge 312 to the bridge 314, and a link from the bridge 314 to the Ext-AP 302. If both links are good links (e.g., RSSI above the threshold signal value), then the good count in the network path through the bridge 314 is the numeric value 2. A similar determination is made for the network path through the link 316. By comparing the good counts, the bridge 312 selects the upstream link for which the good count is greater. If there are more than two good upstream links available, the bridge selects the link with the maximum good count value.

The comparison of the parameters for selecting an upstream link can be done in sequence. In some implementations, the RSSI values are compared first. If the RSSI comparison does not result in selecting one upstream link, e.g., in cases where two or more upstream links have equivalent RSSI values, then additional parameters are compared. In this context, two RSSI values are considered to be equivalent if they are the same, or if they are within a certain range of each other (e.g., the absolute difference between the two RSSI values is within 5 dBm or some other suitable value).

In some implementations, when two or more RSSI values are equivalent, then the hop count values are compared. If two or more upstream links have the same hop count value, then the good count values are compared.

In some implementations, the sequence in which the parameters are compared is different. For example, the hop count can be compared first. If two or more upstream links have the same hop count value, then the good count values are compared. If two or more upstream links have the same good count value, then the RSSI values are compared. Other sequence combinations are also possible.

In some implementations, two or more upstream links can be similar based on the various parameters that are compared. For example, the hop counts and the good counts can be the same, while the RSSI values can be equivalent. In such cases, if there is any difference in the RSSI values, then the upstream node with the lowest RSSI value is selected. On the other hand, if the RSSI values are the same, then an upstream node may be randomly selected.

In some cases, the RSSI values for all upstream nodes may be lower than the threshold signal value, e.g., there may not be any good upstream links. In such cases, the bridge device selects an upstream node with the highest RSSI value (which is still lower than the threshold signal value), and continues to perform the periodic scans for a good upstream link. e.g., an upstream node with an RSSI value that is higher than the threshold signal value.

By comparing the connection parameters for network connections as described above, a bridge device may identify a new upstream node that is better (e.g., higher RSSI value and/or lower hop count) than the upstream node to which the bridge is presently connected. For example, the bridge 312 may be connected to the upstream bridge 316. Based on comparing one or more connection parameters for the bridges 314 and 316, the bridge 312 may determine that the upstream link to the bridge 314 is better than the upstream link to the bridge 316 (e.g., the RSSI for the In-AP interface of bridge 314 may be greater than the RSSI for the In-AP interface of the bridge 316). Following this determination, the bridge 312 disconnects its In-STA interface from the existing upstream connection to the In-AP interface of the bridge 316. The bridge 312 then connects its In-STA interface to the In-AP interface of the bridge 314, thereby forming a new network path to reach the Ext-AP 302 through the bridge 314.

In the above manner, a bridge device uses auto link to dynamically reconfigure its upstream network connections to find the best network path to the external access point. FIG. 3 shows the network paths in the system 300 after dynamic reconfiguration using auto link. As shown, the dotted line links A(x) and B(x) in FIG. 3 are determined to be redundant links based on the comparing connection parameters as described above, e.g., alternative upstream links are available with superior connection parameters. The redundant upstream links are removed when new connections are configured.

As noted previously, to configure and/or reconfigure upstream links using auto link, each bridge device transmits probe request message periodically (e.g., when periodic scan settings is enabled in the bridge configuration), or in response to a deterioration or failure in an upstream link. As described above, the bridge 312 may dynamically reconfigure its upstream link to disconnect from the bridge 316 and connect to the bridge 314 following a periodic scan. In this example, the bridge 312 performs the dynamic reconfiguration based on upstream nodes that are already present in the network, e.g., bridge devices 314 and 316. In some implementations, a bridge device detects, during a periodic scan or in response to a probe request message, one or more upstream bridge nodes that are newly added to the network, and can dynamically reconfigure to connect to a newly added upstream bridge node if the link to the newly added bridge has better connection parameters compared to the existing upstream link for the bridge.

Figure 4:
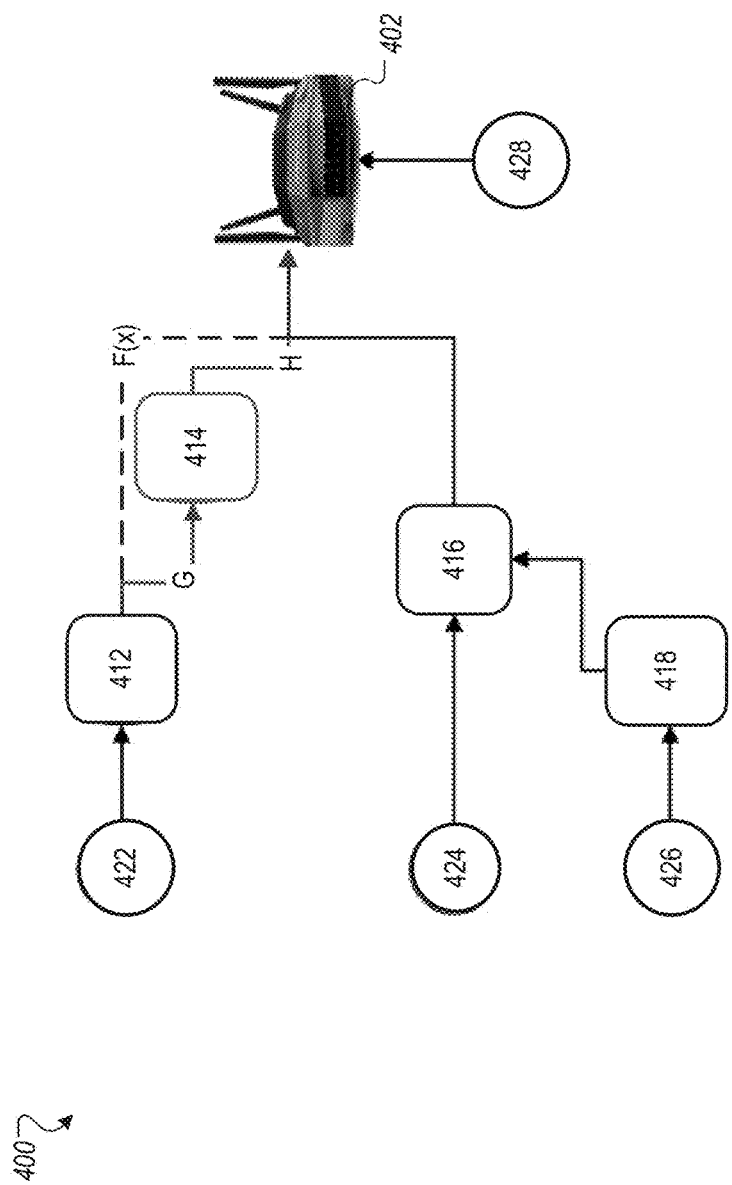
FIG. 4 illustrates an example of a system in which a bridge reconfigures its upstream connection using auto link when a new bridge node is added to the wireless network, according to one or more implementations.

FIG. 4 illustrates an example of a system 400 in which a bridge reconfigures its upstream connection using auto link when a new bridge node is added to the wireless network, according to one or more implementations. The system 400 includes a wireless network with an Ext-AP 402, one or more network devices, e.g., stations 422, 424, 426 and 428, and one or more bridge devices, e.g., bridges 412, 414, 416 and 418. In some implementations, the system 400 is similar to the system 300. For example, the AP 402 is similar to the Ext-AP 302; one or more of the bridge devices 412 and 418 are similar to the bridge devices 312 and 318, respectively, and one or more of the bridge devices 414 and 416 are similar to the bridge devices 314 and 316, respectively; and one or more of the stations 422, 424, 426 and 428 are similar to the stations 322, 324, 326 and 328.

As shown, the network device 414 is a new bridge device that is added to the wireless network of the system 400. The bridge 414 establishes a direct connection to the Ext-AP 402. For example, in some implementations, the bridge 414 receives beacon messages or probe response messages from the Ext-AP 402 and other bridge devices in the network, such as bridges 412 and 416. The bridge 414 compares the RSSI of upper node field of the IE in the received messages, and determines that the RSSI of the Ext-AP 402 is the greatest of the RSSIs from all the bridge nodes in its neighborhood. Following this determination, the bridge 414 connects its In-STA interface to the Ext-AP 402 using the link H.

The bridge 412 is also directly connected to the Ext-AP 402 along the link F(x) prior to and at the time that the bridge 414 is added to the wireless network. In some implementations, the bridge 412 performs auto link, e.g., look for new connections, with periodic scan enabled, as described previously. Alternatively, in some implementations, the bridge 412 performs auto link when its present upstream link fails, or the link quality deteriorates. In either case, the bridge 412 transmits probe request messages and receives a probe response message from the newly added bridge 414. Additionally or alternatively, the bridge 412 receives beacon messages from the bridge 414.

Upon receiving the probe response and/or beacon messages from the bridge 414, the bridge 412 compares the RSSI of upper node field of the IE in the received messages. In some implementations, the bridge 412 determines that the RSSI of the bridge 414 is greater than the RSSI of the Ext-AP 402. Following the determination, the bridge 412 reconfigures its network connections by disconnecting its In-STA interface from the Ext-AP 402, and reconnecting the In-STA interface to the In-AP interface of the bridge 414. Accordingly, the existing upstream link F(x) for the bridge 412 is replaced with a new upstream link G to the bridge 414, such that the network path from the bridge 412 to the Ext-AP 402 includes the links G and H.

In the example illustrated above, the link adaptation is performed based primarily on signal strength, e.g. RSSI. Accordingly, the bridge 412 dynamically reconfigures its upstream link using auto link when a new upstream bridge node is added, with a stronger RSSI signal compared to the existing upstream bridge node. The bridge 412 connects to the bridge 414 even though the hop count to the Ext-AP 402 is increased (e.g., from 1 previously to 2 in the new connection).

Figure 5:
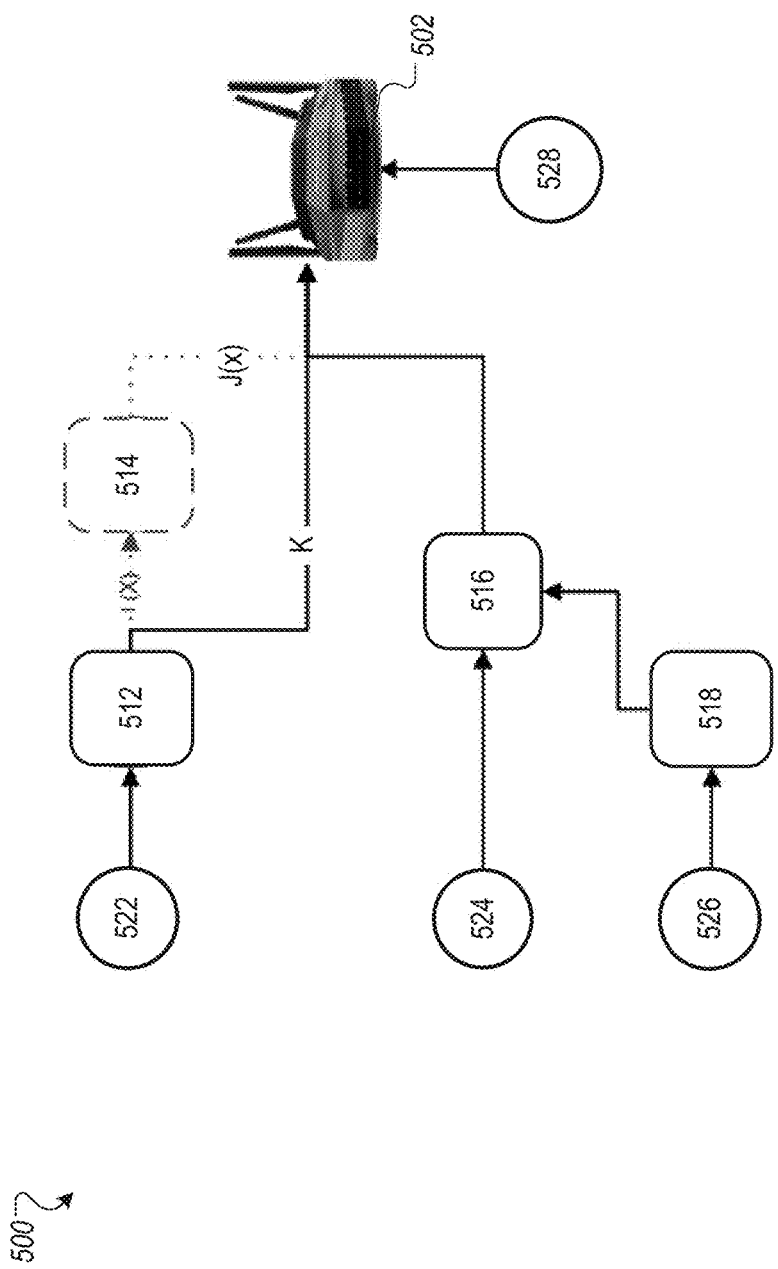
FIG. 5 illustrates an example of a system in which a bridge reconfigures its upstream connection using auto link when a presently connected upstream bridge node is removed from the wireless network, according to one or more implementations.

FIG. 5 illustrates an example of a system 500 in which a bridge reconfigures its upstream connection using auto link when a presently connected upstream bridge node is removed from the wireless network, according to one or more implementations. The system 500 includes a wireless network with an external AP (Ext-AP) 502, one or more network devices, e.g., stations 522, 524, 526 and 528, and one or more bridge devices, e.g., bridges 512, 514, 516 and 518. In some implementations, the system 500 is similar to the system 300. For example, the AP 502 is similar to the Ext-AP 302; one or more of the bridge devices 512 and 518 are similar to the bridge devices 312 and 318, respectively, and one or more of the bridge devices 514 and 516 are similar to the bridge devices 314 and 316, respectively; and one or more of the stations 522, 524, 526 and 528 are similar to the stations 322, 324, 326 and 328.

The bridge 514 is removed from the wireless network, e.g., due to device failure or being powered off. Prior to removal, the bridge 514 was directly connected to the Ext-AP 502 using the link J(x). The bridge 514 was also an upstream node for the bridge 512, which was connected to the Ext-AP 502 along a network path that included an upstream link I(x) to the bridge 514.

When the bridge 514 is removed, the upstream link I(x) of the In-STA interface of the bridge 512 is lost. The loss of the link triggers the bridge 512 to perform a scan for available access points to reestablish an upstream link using auto link. The bridge 512 performs the scan by transmitting probe request messages through its In-STA interface. In some implementations, the probe request messages include the SSID of the Ext-AP 502. In some implementations, the probe request messages are transmitted in the wireless channel of the upstream link I(x). In other implementations, the probe request messages are transmitted in one or more different wireless channels. The wireless channel(s) in which the probe request message is transmitted can be configured, e.g., by configuring a channel parameter in the configuration settings of the bridge 512. After transmitting the probe request message, the bridge 512 waits for a designated time interval, e.g., 5-10 milliseconds, to receive probe response messages from neighboring bridge device. The designated time interval, which is also referred to as the retry interval, can be configured by a user, e.g., by setting a value of a retry interval parameter in the configuration settings of the bridge 512.

In some implementations, the bridge 512 repeats the transmission of the probe request message a designated number of times, e.g., three times, in case suitable probe response messages are not received from any neighboring bridge device within the retry interval. The designated number of retransmissions of the probe request message can be configured by a user, e.g., by setting a value of a retry limit parameter in the configuration settings of the bridge 512.

In some cases, auto recovery is not successful after the designated number of retransmissions, e.g., when the bridge 512 does not receive any suitable probe response messages or beacon messages from neighboring bridge devices that lead to successful establishment of an upstream link. In such cases, the bridge 512 stops its In-AP interface and reverts to a disconnected state. The bridge 512 uses its configuration routine to initiate a new connection in a manner similar to when the bridge is initially powered on, e.g., using the smart configuration mode in the state 202.

In some cases, the bridge 512 receives one or more probe response messages and/or beacon messages from other bridge devices. Upon receiving the probe response or beacon messages, the bridge 512 selects an upstream node that has the strongest RSSI, as determined from the received messages. For example, the bridge 512 may receive probe response messages from the bridges 516 and 518, and the Ext-AP 502. The bridge 512 compares the RSSI of upper node field of the IE in the received messages. The bridge 512 determines that the RSSI of the Ext-AP 502 is greater than the RSSI of the bridge 516 or the RSSI of the bridge 518. Following this determination, the bridge 512 reconfigures its network connections by reconnecting its In-STA interface to the Ext-AP 502. Accordingly, the existing upstream link I(x) for the bridge 512 is replaced with a new upstream link K directly to the Ext-AP 502. In this manner, a bridge, e.g., bridge 512, recovers from link failure by dynamically reconnecting to a new upstream link using auto link.

In some implementations, the upstream connection for a bridge device forms a dead loop. In this context, a dead loop refers to a network path in which a first bridge device is an upstream node to a second bridge device, and the second bridge device is an upstream node to the first bridge device, thereby forming a loop. There may be additional bridge devices in the network path between the two bridge devices, but the network path does not terminate in an external AP. In such cases, a bridge device in a dead loop cannot exchange data with remote devices outside the wireless network.

FIGS. 6A and 6B illustrate examples of dead loops 600A and 600B formed in a wireless network, according to one or more implementations. FIG. 6A shows one example of a dead loop 600A with two bridge devices 602 and 604. As shown, the In-STA interface 602b of the bridge 602 establishes a link to the In-AP interface 604a of the bridge 604. The In-STA interface 604b of the bridge 604, in turn, establishes a link to the In-AP interface 602a of the bridge 602. The network path for neither the bridge 602 nor the bridge 604 connects to an external access point. In this manner, the dead loop 600A is formed between the bridges 602 and 604.

FIG. 6B shows another example of a dead loop 600B with three bridge devices 603, 605 and 606. As shown, the In-STA interface 603b of the bridge 603 establishes a link to the In-AP interface 605a of the bridge 605. The In-STA interface 605b of the bridge 605, in turn, establishes a link to the In-AP interface 606a of the bridge 606. Finally, the In-STA interface 606b of the bridge 606 establishes a link to the In-AP interface 603a of the bridge 603, thereby forming a loop. The network path for none of the bridges 603, 605 or 606 connects to an external access point. In this manner, the dead loop 600B is formed amongst the bridges 603, 605 and 606.

In some implementations, a bridge device uses the Associated BSSID and AID to Ext-AP fields of the IE to detect dead loops. When a bridge device receives a beacon message or a probe response message from another bridge device with an AID to Ext-AP field value that is the same as the AID to Ext-AP field value in beacon messages sent by the bridge device, this indicates that the network paths for the two bridge devices overlap, with the other bridge device being an upstream node. The bridge device receiving the beacon or probe response message compares the hop count in the received message to the present hop count for the bridge device. If the hop count in the received message is greater than the present hop count for the bridge device, then a dead loop is detected.

As shown by the above example, in some cases, a bridge detects a dead loop for an existing connection, e.g., when a bridge receives a beacon or probe response message from an upstream node to which the bridge device is connected. In such cases, the bridge device dynamically reconfigures connections, disconnecting from the upstream node and identifying a different upstream node for a new connection.

In some cases, a dead loop is detected for a prospective upstream connection, e.g., when a bridge device receives a beacon or probe response message from a neighboring node to which the In-STA interface of the bridge device is not connected. In such cases, the bridge device does not connect to the neighboring node even if other connection parameters, such as RSSI of the neighboring node, have better values compared to other nodes.

Figure 7:
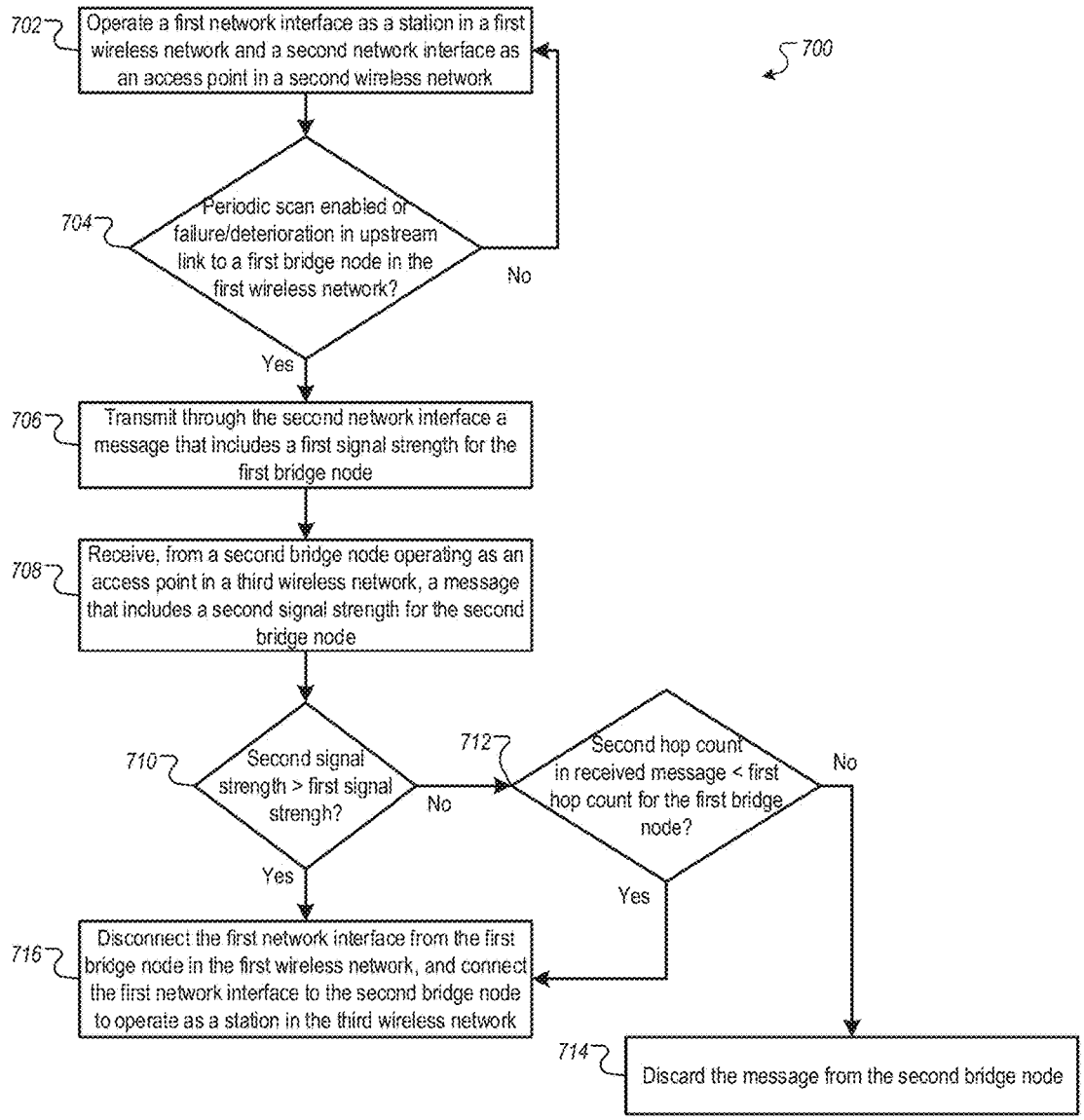
FIG. 7 illustrates an example of a process for dynamically configuring network connections for a bridge using auto link, according to one or more implementations.

FIG. 7 illustrates an example of a process 700 for dynamically configuring network connections for a bridge using auto link, according to one or more implementations. The process 700 can be performed by the bridge 312. Accordingly, the following sections describe the process 700 with respect to the bridge 312. However, the process 700 also may be performed by other suitable devices (e.g., any of the bridges 314, 316 or 318).

In some implementations, the process 700 is performed by one or more processors associated with the bridge device, which execute instructions stored in memory coupled to the bridge device. For example, the CPU of the bridge 312 (e.g., similar to the CPU 114) performs the process 700 by executing instructions stored in memory coupled to the bridge 312 (e.g., similar to the memory 116).

At 702, a first network interface is operated as a station in a first wireless network and a second network interface is operated as an access point in a second wireless network. For example, the bridge 312 controls an In-STA interface of the bridge 312 to operate as a station in a first internal wireless network formed by the bridge 314. In addition, the bridge 312 controls an In-AP interface of the bridge 312 to operate as an access point in a second internal wireless network formed by the bridge 312.

At 704, a determination is made whether periodic scan is enabled, or whether an upstream link to a first bridge node in the first wireless network has failed or deteriorated. For example, the bridge 312 checks its configuration settings to determine whether a configuration parameter for periodic scans to dynamically update network connections using auto link is enabled. If the periodic scan is enabled, the bridge 312 checks whether the periodic scan interval has expired, such that a new probe request message is to be transmitted. Additionally or alternatively, the bridge 312 checks whether its upstream link to a bridge node has failed (e.g., acknowledgements are not received for transmitted data or ping messages), or the upstream link quality has deteriorated, e.g., the RSSI of the upstream node has fallen below a designated threshold signal level.

If a determination is made that periodic scan is not enabled, and/or that the upstream link to a first bridge node in the first wireless network has not failed or deteriorated, then the bridge continues to operate the first network interface as a station in the first wireless network and the second network interface as an access point in the second wireless network. On the other hand, if a determination is made that periodic scan is enabled, and/or that the upstream link to a first bridge node in the first wireless network has failed or deteriorated, then at 706 a message is transmitted through the second network interface, the message including a first signal strength for the first bridge node. For example, when periodic scan is enabled, the bridge 312 transmits a probe request message upon expiry of the scan interval timer. Additionally or alternatively, if the bridge 312 determines that the existing upstream link to the bridge 314 has failed, or the link quality has deteriorated, then the bridge 312 transmits a probe request message in its neighborhood. The transmitted probe request message includes, the RSSI of the upstream bridge 314 to which the bridge 312 is connected.

At 708, a message is received from a second bridge node operating as an access point in a third wireless network, the message including a second signal strength for the second bridge node. For example, the bridge 312 receives a beacon message or a probe response message from one or more other bridge devices in the wireless network, such as the bridge 316, which operates an internal wireless network through its In-AP interface. The beacon or probe response message received from the bridge 316 includes the RSSI of upper node of the bridge 316.

At 710, a determination is made whether the second signal strength is greater than the first signal strength. For example, the bridge 312 obtains the RSSI of the bridge 316 from the beacon or probe response message received from the bridge 316. The bridge 312 compares the RSSI of the bridge 316 to the RSSI of the present upstream bridge 314.

If a determination is made that the second signal strength is not greater than the first signal strength, then at 712, a determination is made whether a second hop count in the received message is less than a first hop count for the first bridge node. For example, the bridge 312 may determine that the RSSI for the bridge 316 is equivalent to the RSSI for the bridge 314. Following this determination, the bridge 312 compares other connection parameters included in the message received from the bridge 316. For example, the message received from the bridge 316 may include, in the HopCount to Ext-AP field of the IE, the hop count value to the Ext-AP 302 from the bridge 316, which indicates the number of hops needed to reach the Ext-AP 302 from the bridge 316. The bridge 312 checks whether the hop count to the Ext-AP 302 from the bridge 316 is less than the hop count to the Ext-AP 302 from the bridge 314, where the latter indicates the number of hops needed to reach the Ext-AP 302 from the bridge 314.

If a determination is made at 712 that the second hop count for the second bridge node in the received message is not less than the first hop count for the first bridge node, then at 714 the message from the second bridge node is discarded. For example, following the comparisons at 710 and 712, the bridge 312 may determine that the RSSI for the bridge 316 is not better than the RSSI for the bridge 314, and the hop count to the Ext-AP 302 from the bridge 316 is not less than the hop count to the Ext-AP 302 from the bridge 314. In such cases, the bridge 312 determines that the upstream link to the bridge 316 is not better than the existing upstream link to the bridge 314. Accordingly, the bridge 312 discards the message received from the bridge 316, without establishing a new upstream connection to the bridge 316.

On the other hand, if a determination is made at 710 that the second signal strength is greater than the first signal strength, or a determination is made at 712 that the second hop count for the second bridge node in the response message is less than the first hop count for the first bridge node when the signal strengths are equivalent, then at 716, the first network interface is disconnected from the first bridge node in the first wireless network, and the first network interface is connected to the second bridge node to operate as a station in the third wireless network. For example, following the comparisons at 710, the bridge 312 may determine that the RSSI for the bridge 316 is better than the RSSI for the bridge 314. Alternatively, if the RSSI values are equivalent, then at 712 the bridge 312 may determine that the hop count to the Ext-AP 302 from the bridge 316 is less than the hop count to the Ext-AP 302 from the bridge 314. In such cases, the bridge 312 determines that the upstream link to the bridge 316 is better than the existing upstream link to the bridge 314. Accordingly, the bridge 312 disconnects its In-STA interface from the In-AP interface of the bridge 314, and reconnects the In-STA interface to the In-AP interface of the bridge 316, thereby establishing a new upstream connection to the bridge 316. In this manner, the bridge 312 dynamically reconfigures its network connections using auto link.

Figure 8:
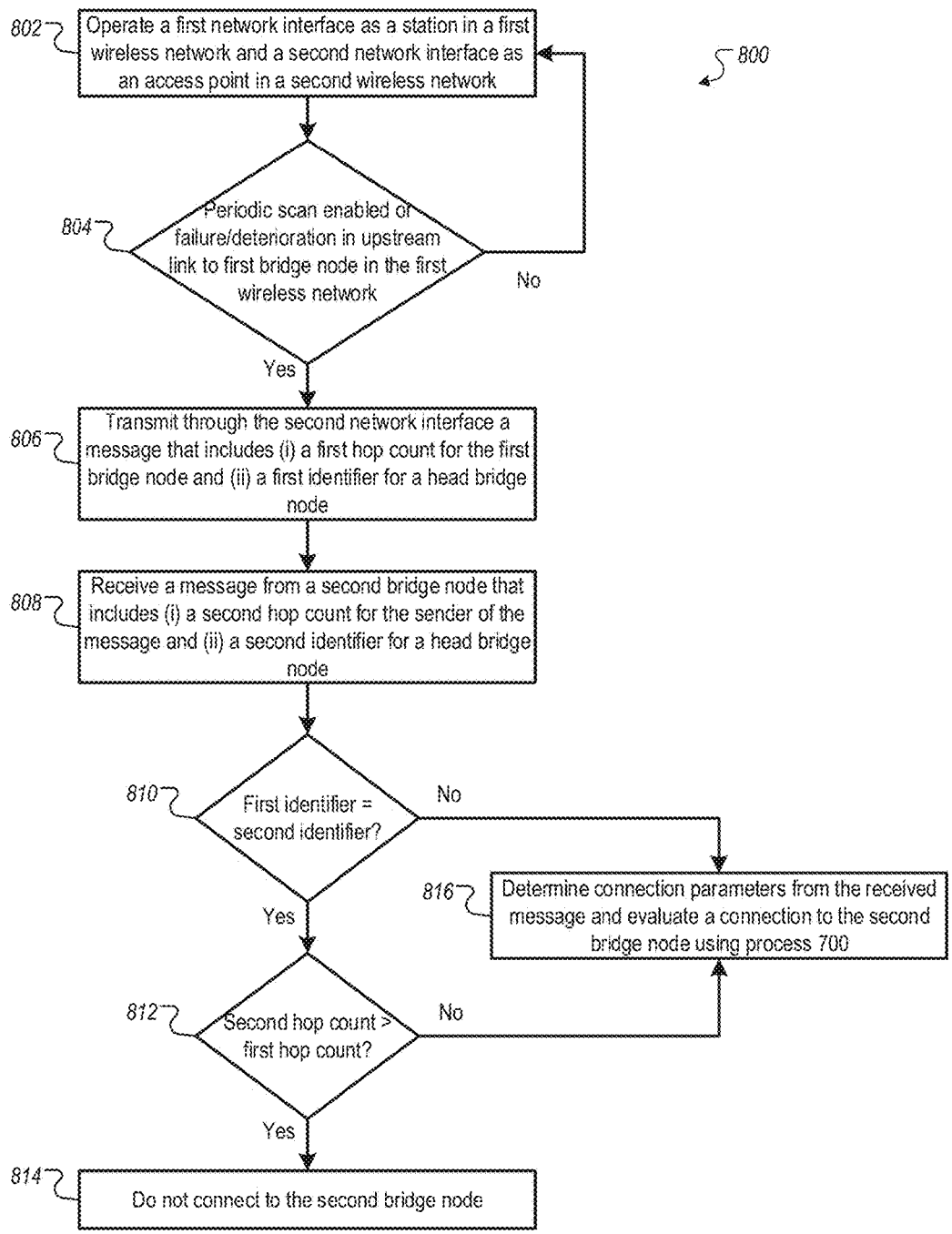
FIG. 8 illustrates an example of a process for avoiding dead loops while configuring network connections for a bridge using auto link, according to one or more implementations.

FIG. 8 illustrates an example of a process 800 for avoiding dead loops while configuring network connections for a bridge using auto link, according to one or more implementations. The process 800 can be performed by the bridge 314. Accordingly, the following sections describe the process 800 with respect to the bridge 314 in the system 300. However, the process 800 also may be performed by other suitable devices (e.g., any of the bridges 312, 316 or 318).

In some implementations, the process 800 is performed by one or more processors associated with the bridge device, which execute instructions stored in memory coupled to the bridge device. For example, the CPU of the bridge 314 (e.g., similar to the CPU 114) performs the process 800 by executing instructions stored in memory coupled to the bridge 314 (e.g., similar to the memory 116).

At 802, a first network interface is operated as a station in a first wireless network and a second network interface is operated as an access point in a second wireless network. For example, the bridge 314 controls an In-STA interface of the bridge 314 to operate as a station that is connected to the Ext-AP 302. In addition, the bridge 314 controls an In-AP interface of the bridge 314 to operate as an access point in an internal wireless network formed by the bridge 314.

At 804, a determination is made whether periodic scan is enabled, or whether an upstream link to a first bridge node in the first wireless network has failed or deteriorated. For example, the bridge 314 checks its configuration settings to determine whether a parameter for periodic scans to dynamically update network connections using auto link is enabled. If the periodic scan is enabled, the bridge 314 checks whether the periodic scan interval has expired, such that a new probe request message is to be transmitted. Additionally or alternatively, the bridge 314 checks whether its upstream link to the Ext-AP 302 has failed (e.g., acknowledgements are not received for transmitted data or ping messages), or the upstream link quality has deteriorated, e.g., the signal level of the upstream link has fallen below a designated threshold signal level.

If a determination is made that periodic scan is not enabled, and/or that the upstream link to a first bridge node in the first wireless network has not failed or deteriorated, then the bridge continues to operate the first network interface as a station connected to the Ext-AP 302 and the second network interface as an access point in the internal wireless network. On the other hand, if a determination is made that periodic scan is enabled, and/or that the upstream link to the Ext-AP 302 has failed or deteriorated, then at 806 a message is transmitted through the second network interface, the message including (i) a first hop count for the first bridge node and (ii) a first identifier for a head bridge node. For example, when periodic scan is enabled, the bridge 314 transmits a probe request message upon expiry of the scan interval timer. Additionally or alternatively, if the bridge 314 determines that the existing upstream link to the Ext-AP 302 has failed, or the link quality has deteriorated, then the bridge 314 transmits a probe request message in its neighborhood. The beacon or probe response messages from the neighborhood bridges include, in the corresponding fields of the IE, the hop count from the bridge 314 to the Ext-AP 302, and an identifier for a head bridge node that is directly connected to the Ext-AP 302 (which, in this case, is the bridge 314 itself).

At 808, a message is received from a second bridge node operating as an access point in a third wireless network, the received message including (i) a second hop count for the sender of the message and (ii) a second identifier for a head bridge node. For example, in some implementations, the bridge 314 receives a beacon message or a probe response message from the bridge 312. The beacon or probe response message received from the bridge 312 includes, in the corresponding fields of the IE, the hop count from the bridge 312 to the Ext-AP 302, and an identifier for a head bridge node that is directly connected to the Ext-AP 302 in the network path used by the bridge 312. The latter value is the bridge 314.

At 810, a determination is made whether the first identifier is same as the second identifier. For example, the bridge 314 compares the identifier of the head bridge node in the received message to the identifier for the head bridge node for its existing network path to the Ext-AP 302.

If a determination is made at 810 that the first identifier is same as the second identifier, then at 812, a determination is made whether a second hop count is greater than the first hop count. For example, the bridge 314 may determine that the identifier for the head bridge node in the message received from the bridge 312 is the identifier for the bridge 314, which is also the head bridge node for the existing network path of the bridge 314 to the Ext-AP 302. This indicates that the network paths to the external AP for the bridges 314 and 312 overlap. In response to this determination, the bridge 314 checks whether the hop count to the Ext-AP 302 from the bridge 312 is greater than the hop count to the Ext-AP 302 from the bridge 312.

If a determination is made at 812 that the second hop count is greater than the first hop count, then at 814 a connection to the second bridge node is not made. For example, following the comparisons at 810 and 812 based on a message received from the bridge 312, the bridge 314 may determine that the hop count to the Ext-AP 302 from the bridge 312 is the numeric value 2, which is greater than the hop count to the Ext-AP from the bridge 314, e.g., the numeric value 1. Since the upstream connections for the bridges 314 and 312 overlap (e.g., their head bridge node is the same bridge 314), the greater hop count for the bridge 312 indicates that there is a dead loop through the connection to the bridge 312. In response to this determination, the bridge 314 does not attempt to establish an upstream connection to the bridge 312, but instead discards the message received from the bridge 312.

On the other hand, if a determination is made at 810 that the first identifier is different from the second identifier, or a determination is made at 812 that the second hop count is less than the first hop count, then at 816, connection parameters are determined from the response message and a connection to the second bridge node is evaluated using the process 700. For example, the bridge 314 may receive a beacon or a response message from the bridge 316, which has a different head bridge node to the Ext-AP 302, e.g., the bridge 316 itself. Following the comparison at 810, the bridge 314 determines that the head bridge node indicated in the received message (e.g., the bridge 316) is different from the head bridge node for the existing connection for the bridge 314 (e.g., the bridge 314). As another example, in some cases, the bridge 312 may be connected on a network path to the bridge 314 through one or more other intermediate bridges, where the bridge 314 is directly connected to the Ext-AP 302. In such cases, the bridge 312 may receive a beacon or a response message from the bridge 314. Since the head bridge node in the received message is same as the head bridge node for the existing connection for the bridge 312 (e.g., the bridge 314), the bridge 312 performs the hop count comparison at 812. Following the comparison at 812, the bridge 312 determines that the hop count to the Ext-AP 302 from the bridge 314 is the numeric value 1, which is less than the hop count to the Ext-AP 302 from the bridge 312 (e.g., a numeric value greater than 2). In such cases, the bridge 312 determines that a dead loop does not exist for a connection through the upstream node 314. Accordingly, the bridge 312 checks one or more connection parameters for the upstream node, e.g., RSSI, to determine whether to dynamically reconfigure its upstream connection to connect to the bridge 314. In this manner, a bridge detects and avoids dead loops while updating network connections using auto link.

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and the computer program can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices. e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
controlling a first network interface of a wireless network device to operate as a station in a first wireless network;
controlling a second network interface of the wireless network device to operate as an access point in a second wireless network;
transmitting, through the second network interface, a beacon message that includes a first signal strength of a first bridge node operating as an access point in the first wireless network;
receiving, at the second network interface, a probe response message from a second bridge node that operates as an access point in a third wireless network, the probe response message including a second signal strength of the second bridge node;
comparing, by the wireless network device, the first signal strength to the second signal strength; and
conditioned on determining that the second signal strength is greater than the first signal strength:
disconnecting the first network interface from the first bridge node in the first wireless network, and
connecting the first network interface to the second bridge node, the first network interface to operate as a station in the third wireless network,
wherein transmitting the beacon message comprises
determining whether a periodic network scan is enabled based on operational parameters of the wireless network device,
in response to a determination that the periodic network scan is enabled, determining whether a periodic scan interval has expired, and
transmitting the beacon message in response to a determination that the periodic scan interval has expired.

2. The method of claim 1, wherein the beacon message further includes a first hop count, the first hop count indicating a first number of hops to reach an external access point following a first network path through the first bridge node, and
the probe response message further includes a second hop count, the second hop count indicating a second number of hops to reach the external access point following a second network path through the second bridge node, the method further comprising:
conditioned on determining that the second signal strength is equivalent to the first signal strength, comparing, by the wireless network device, the first hop count to the second hop count; and conditioned on determining that the second hop count is less than the first hop count:
disconnecting the first network interface from the first bridge node in the first wireless network, and
connecting the first network interface to the second bridge node, the first network interface to operate as a station in the third wireless network.

3. A method, comprising:
controlling a first network interface of a wireless network device to operate as a station in a first wireless network;
controlling a second network interface of the wireless network device to operate as an access point in a second wireless network;
transmitting, through the second network interface, a beacon message that includes a first signal strength of a first bridge node operating as an access point in the first wireless network;
receiving, at the second network interface, a probe response message from a second bridge node that operates as an access point in a third wireless network, the probe response message including a second signal strength of the second bridge node;
comparing, by the wireless network device, the first signal strength to the second signal strength; and
conditioned on determining that the second signal strength is greater than the first signal strength:
disconnecting the first network interface from the first bridge node in the first wireless network, and
connecting the first network interface to the second bridge node, the first network interface to operate as a station in the third wireless network,
wherein transmitting the beacon message comprises:
examining operational parameters of the wireless network device;
based on the examination, determining that a periodic network scan is enabled;
in response to the determination, starting a timer; and
transmitting the beacon message upon expiration of the timer.

4. The method of claim 3, wherein a value of the timer is configurable by a user.

5. The method of claim 1, wherein transmitting the beacon message comprises:
determining, by the wireless network device, that the first signal strength is below a threshold value; and
in response to the determination, transmitting the beacon message.

6. The method of claim 5, further comprising:
determining, by the wireless network device, that the second signal strength is below the threshold value; and
in response to determining that the second signal strength is below the threshold value and conditioned on determining that the second signal strength is greater than the first signal strength:
disconnecting the first network interface from the first bridge node in the first wireless network and connecting the first network interface to the second bridge node, the first network interface to operate as a station in the third wireless network, and
transmitting a new beacon message that includes the second signal strength of the second bridge node.

7. The method of claim 1, wherein transmitting the beacon message comprises:
determining, by the wireless network device, failure in message transmission from the first network interface through the first bridge node; and
in response to the determination, transmitting the beacon message.

8. The method of claim 1, further comprising:
based on connecting the first network interface to the second bridge node to operate as the station in the third wireless network, transmitting, through the second network interface, a new beacon message that includes the second signal strength of the second bridge node.

9. The method of claim 1, wherein the wireless network device is configured to operate as a bridge node between the first wireless network and the second wireless network, the method further comprising:
determining, by the wireless network device, that the wireless network device is enabled to operate as a third bridge node; and
based on the determination, transmitting the beacon message.

10. The method of claim 1, wherein the beacon message that includes the first signal strength of the first bridge node is a first beacon message transmitted by the wireless network device, the method further comprising:
transmitting, through the second network interface operating as the access point in the second wireless network, a second beacon message that includes (i) a first hop count, the first hop count indicating a first number of hops to reach an external access point following a first network path through the second bridge node and (ii) a first identifier for a head bridge node that is directly connected to the external access point in the first network path;
receiving, at the second network interface, a new response message from the second bridge node, the new response message including (i) a second hop count, the second hop count indicating a second number of hops to reach the external access point following a second network path through the second bridge node and (ii) a second identifier for a head bridge node that is directly connected to the external access point in the second network path;
determining, by the wireless network device, that the first identifier for the head bridge node in the first network path is same as the second identifier for the head bridge node in the second network path;
based on the determination, comparing, by the wireless network device, the first hop count to the second hop count; and
conditioned on determining that the second hop count is greater than the first hop count:
obtaining information about a third bridge node operating as an access point in a fourth wireless network,
disconnecting the first network interface from the second bridge node in the third wireless network, and
connecting the first network interface to the third bridge node, the first network interface to operate as a station in the fourth wireless network.

11. The method of claim 1, wherein the beacon message includes (i) a first hop count, the first hop count indicating a first number of hops to reach an external access point following a first network path through the first bridge node and (ii) a first identifier for a head bridge node that is directly connected to the external access point in the first network path, the method further comprising:
receiving, at the second network interface, a response message from a third bridge node that operates as an access point in a fourth wireless network, the response message including (i) a second hop count, the second hop count indicating a second number of hops to reach the external access point following a second network path through the third bridge node and (ii) a second identifier for a head bridge node that is directly connected to the external access point in the second network path;

determining, by the wireless network device, that the first identifier for the head bridge node in the first network path is same as the second identifier for the head bridge node in the second network path;

based on the determination, comparing the first hop count to the second hop count; and conditioned on determining that the second hop count is greater than the first hop count, discarding the response message from the third node without connecting to the third bridge node.

12. A wireless network device comprising:
one or more processors; and
a storage medium storing instructions that, when executed by the one or more processors, are configured to cause the processors to:
   control a first network interface of the wireless network device to operate as a station in a first wireless network;
   control a second network interface of the wireless network device to operate as an access point in a second wireless network;
   transmit, through the second network interface, a beacon message that includes a first signal strength of a first bridge node operating as an access point in the first wireless network;
   receive, at the second network interface, a probe response message from a second bridge node that operates as an access point in a third wireless network, the probe response message including a second signal strength of the second bridge node;
   compare the first signal strength to the second signal strength; and
   conditioned on determining that the second signal strength is greater than the first signal strength:
      disconnect the first network interface from the first bridge node in the first wireless network, and
      connect the first network interface to the second bridge node, the first network interface to operate as a station in the third wireless network,
   wherein transmitting the beacon message comprises
      determining whether a periodic network scan is enabled based on operational parameters of the wireless network device,
      in response to a determination that the periodic network scan is enabled, determining whether a periodic scan interval has expired, and
      transmitting the beacon message in response to a determination that the periodic scan interval has expired.

13. The wireless network device of claim 12, wherein the beacon message further includes a first hop count, the first hop count indicating a first number of hops to reach an external access point following a first network path through the first bridge node, and
   the probe response message further includes a second hop count, the second hop count indicating a second number of hops to reach the external access point following a second network path through the second bridge node, wherein the processors are further configured to:
      conditioned on determining that the second signal strength is equivalent to the first signal strength, compare the first hop count to the second hop count; and
      conditioned on determining that the second hop count is less than the first hop count:
         disconnect the first network interface from the first bridge node in the first wireless network, and
         connect the first network interface to the second bridge node, the first network interface to operate as a station in the third wireless network.

14. A wireless network device comprising:
one or more processors; and
a storage medium storing instructions that, when executed by the one or more processors, are configured to cause the processors to:
   control a first network interface of the wireless network device to operate as a station in a first wireless network;
   control a second network interface of the wireless network device to operate as an access point in a second wireless network;
   transmit, through the second network interface, a beacon message that includes a first signal strength of a first bridge node operating as an access point in the first wireless network;
   receive, at the second network interface, a probe response message from a second bridge node that operates as an access point in a third wireless network, the probe response message including a second signal strength of the second bridge node;
   compare the first signal strength to the second signal strength; and
   conditioned on determining that the second signal strength is greater than the first signal strength:
      disconnect the first network interface from the first bridge node in the first wireless network, and
      connect the first network interface to the second bridge node, the first network interface to operate as a station in the third wireless network,
   wherein transmitting the beacon message comprises:
      examining operational parameters of the wireless network device;
      based on the examination, determining that a periodic network scan is enabled;
      in response to the determination, starting a timer; and
      transmitting the beacon message upon expiration of the timer.

15. The wireless network device of claim 14, wherein a value of the timer is configurable by a user.

16. The wireless network device of claim 12, wherein transmitting the beacon message comprises:
   determining that the first signal strength is below a threshold value; and
   in response to the determination, transmitting the beacon message.

17. The wireless network device of claim 16, wherein the processors are further configured to:
   determine that the second signal strength is below the threshold value; and
   in response to determining that the second signal strength is below the threshold value and conditioned on determining that the second signal strength is greater than the first signal strength:
      disconnect the first network interface from the first bridge node in the first wireless network and connecting the first network interface to the second bridge node, the first network interface to operate as a station in the third wireless network, and
      transmit a new beacon message that includes the second signal strength of the second bridge node.

18. The wireless network device of claim 12, wherein transmitting the beacon message comprises:
    determining failure in message transmission from the first network interface through the first bridge node; and
    in response to the determination, transmitting the beacon message.

19. The wireless network device of claim 12, wherein the processors are further configured to:
    based on connecting the first network interface to the second bridge node to operate as the station in the third wireless network, transmit, through the second network interface, a new beacon message that includes the second signal strength of the second bridge node.

20. The wireless network device of claim 12, wherein the wireless network device is configured to operate as a bridge node between the first wireless network and the second wireless network, and wherein the processors are further configured to:
    determine that the wireless network device is enabled to operate as a third bridge node; and
    based on the determination, transmit the beacon message.

21. The wireless network device of claim 12, wherein the beacon message that includes the first signal strength of the first bridge node is a first beacon message transmitted by the wireless network device, and wherein the processors are further configured to:
    transmit, through the second network interface operating as the access point in the second wireless network, a second beacon message that includes (i) a first hop count, the first hop count indicating a first number of hops to reach an external access point following a first network path through the second bridge node and (ii) a first identifier for a head bridge node that is directly connected to the external access point in the first network path;
    receive, at the second network interface, a new response message from the second bridge node, the new response message including (i) a second hop count, the second hop count indicating a second number of hops to reach the external access point following a second network path through the second bridge node and (ii) a second identifier for a head bridge node that is directly connected to the external access point in the second network path;
    determine that the first identifier for the head bridge node in the first network path is same as the second identifier for the head bridge node in the second network path;
    based on the determination, compare the first hop count to the second hop count; and
    conditioned on determining that the second hop count is greater than the first hop count:
        obtain information about a third bridge node operating as an access point in a fourth wireless network,
        disconnect the first network interface from the second bridge node in the third wireless network, and
        connect the first network interface to the third bridge node, the first network interface to operate as a station in the fourth wireless network.

22. The wireless network device of claim 12, wherein the beacon message includes (i) a first hop count, the first hop count indicating a first number of hops to reach an external access point following a first network path through the first bridge node and (ii) a first identifier for a head bridge node that is directly connected to the external access point in the first network path, and wherein the processors are further configured to:
    receive, at the second network interface, a response message from a third bridge node that operates as an access point in a fourth wireless network, the response message including (i) a second hop count, the second hop count indicating a second number of hops to reach the external access point following a second network path through the third bridge node and (ii) a second identifier for a head bridge node that is directly connected to the external access point in the second network path;
    determine that the first identifier for the head bridge node in the first network path is same as the second identifier for the head bridge node in the second network path;
    based on the determination, compare the first hop count to the second hop count; and
    conditioned on determining that the second hop count is greater than the first hop count, discard the response message from the third node without connecting to the third bridge node.

* * * * *